US011951737B2

(12) United States Patent
Yokoo et al.

(10) Patent No.: US 11,951,737 B2
(45) Date of Patent: Apr. 9, 2024

(54) LIQUID DISCHARGE HEAD UNIT AND LIQUID DISCHARGE DEVICE

(71) Applicant: SEIKO EPSON CORPORATION, Tokyo (JP)

(72) Inventors: Shoichiro Yokoo, Matsumoto (JP); Noritaka Ide, Shiojiri (JP); Eiju Hirai, Azumino (JP); Masaki Mori, Shiojiri (JP); Yu Shiozawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 112 days.

(21) Appl. No.: 17/812,386

(22) Filed: Jul. 13, 2022

(65) Prior Publication Data

US 2023/0020830 A1 Jan. 19, 2023

(30) Foreign Application Priority Data

Jul. 14, 2021 (JP) ................................ 2021-116441

(51) Int. Cl.
*B41J 2/045* (2006.01)
*B41J 2/14* (2006.01)

(52) U.S. Cl.
CPC ....... *B41J 2/04563* (2013.01); *B41J 2/04565* (2013.01); *B41J 2/04581* (2013.01); *B41J 2/14233* (2013.01); *B41J 2002/14491* (2013.01)

(58) Field of Classification Search
CPC ..... B41J 2/045; B41J 29/38; B41J 2/16; B41J 2/14; B41J 2/07; B41J 2/145; G05D 23/24; H05K 1/00; H05K 3/34; H05K 1/11; H01R 4/02
See application file for complete search history.

(56) References Cited

U.S. PATENT DOCUMENTS 6,154,229 A * 11/2000 Corrigan .............. B41J 2/04543 347/17
8,616,672 B2 * 12/2013 Tatsumi ..................... B41J 2/38 347/17
2010/0238226 A1 * 9/2010 Tanaka ................. B41J 2/04563 347/17
2013/0083102 A1 * 4/2013 Kondo ................. B41J 2/14209 347/9
2017/0087833 A1 * 3/2017 Sugiura ................ B41J 2/14072
2018/0264807 A1 * 9/2018 Ito ............................ B41J 2/161
2022/0258472 A1 * 8/2022 Hirai .................... B41J 2/14233
2023/0018898 A1 * 1/2023 Ide ....................... B41J 2/14233

FOREIGN PATENT DOCUMENTS

JP 2011-104916 6/2011

* cited by examiner

*Primary Examiner* — John Zimmermann
(74) *Attorney, Agent, or Firm* — WORKMAN NYDEGGER

(57) ABSTRACT

A distance between the first circuit and the second circuit is a first distance, a distance between the first circuit and the temperature detection circuit is a second distance longer than the first distance, and a distance between the second circuit and the temperature detection circuit is a third distance longer than the first distance.

19 Claims, 10 Drawing Sheets

LIQUID DISCHARGE HEAD UNIT AND LIQUID DISCHARGE DEVICE

The present application is based on, and claims priority from JP Application Serial Number 2021-116441, filed Jul. 14, 2021, the disclosure of which is hereby incorporated by reference herein in its entirety.

BACKGROUND

1. Technical Field

The present disclosure relates to a liquid discharge head unit and a liquid discharge device.

2. Related Art

Described is a printer that changes the number of maintenance drive pulses applied to a piezoelectric element based on an environmental temperature detected by a temperature sensor on a side surface of a carriage on which a liquid discharge head is mounted.

JP-A-2011-104916 is an example of the related art.

In a liquid discharge head provided with a piezoelectric element, a temperature of ink in a pressure chamber may not be accurately detected when a temperature detection circuit is provided outside the liquid discharge head. Therefore, there is a demand for disposing the temperature detection circuit inside the liquid discharge head. However, when the temperature detection circuit is simply disposed at a wiring substrate inside the liquid discharge head, temperature measurement accuracy by the temperature detection circuit may decrease.

SUMMARY

The present disclosure can be realized in the following aspects.

According to a first aspect of the present disclosure, there is provided a liquid discharge head unit. The liquid discharge head unit includes a liquid discharge head provided with a pressure chamber substrate having a plurality of pressure chambers, a piezoelectric element laminated at the pressure chamber substrate to apply pressure to each of the plurality of pressure chambers, and a drive wiring for applying a voltage for driving the piezoelectric element to the piezoelectric element, and a wiring substrate electrically coupled to the liquid discharge head. The liquid discharge head is provided with a detection resistor formed of the same material as the piezoelectric element or the drive wiring and used to detect a temperature of the pressure chamber. The wiring substrate is provided with a first circuit, a second circuit different from the first circuit, and a temperature detection circuit electrically coupled to the detection resistor. The first circuit, the second circuit, and the temperature detection circuit are provided at the wiring substrate so that a distance between the first circuit and the second circuit is a first distance, a distance between the first circuit and the temperature detection circuit is a second distance longer than the first distance, and a distance between the second circuit and the temperature detection circuit is a third distance longer than the first distance.

According to a second aspect of the present disclosure, there is provided a liquid discharge device. The liquid discharge device includes the liquid discharge head unit according to the first aspect and a liquid accommodation section that accommodates a liquid discharged from the liquid discharge head unit.

DESCRIPTION OF EXEMPLARY EMBODIMENTS

A. First Embodiment

Figure 1:
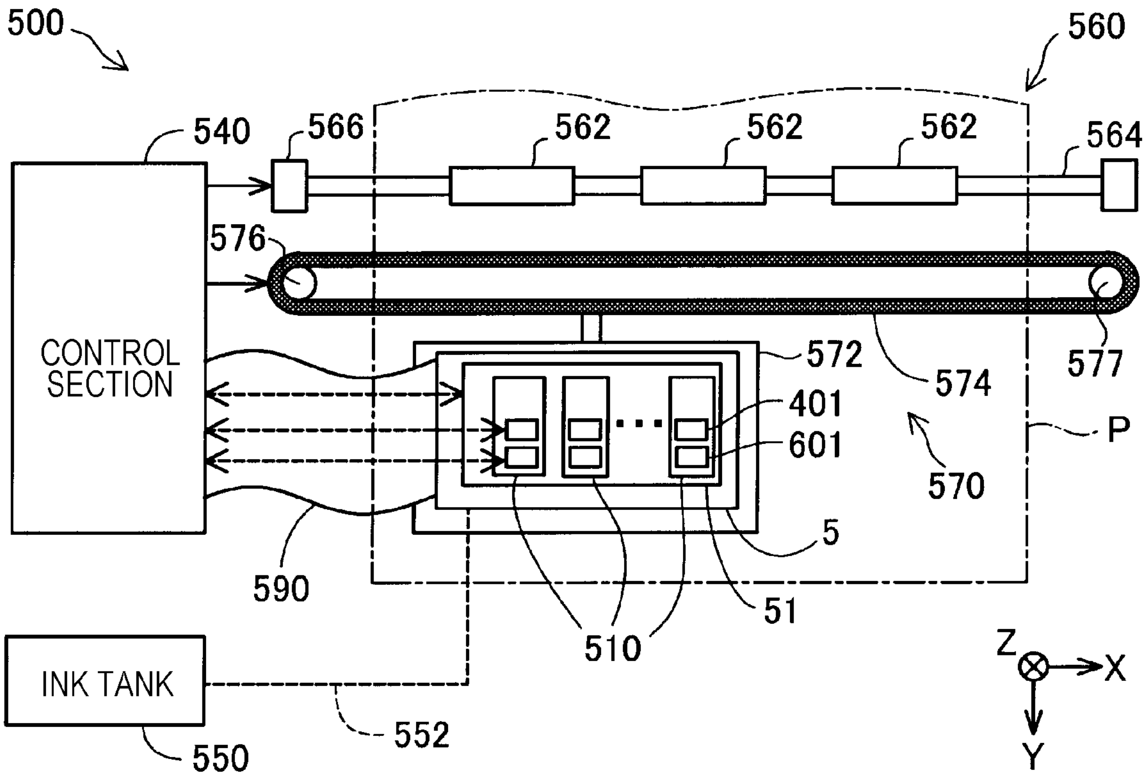
FIG. 1 is an explanatory diagram showing a schematic configuration of a liquid discharge device.

FIG. 1 is an explanatory diagram showing a schematic configuration of a liquid discharge device 500 as a first embodiment of the present disclosure. In the present embodiment, the liquid discharge device 500 is an ink jet printer that discharges ink as an example of a liquid onto printing paper P to form an image. The liquid discharge device 500 may use any kind of medium, such as a resin film or a cloth, as an ink discharge target, instead of the printing paper P. X, Y, and Z shown in FIG. 1 and each drawings subsequent to FIG. 1 represent three spatial axes orthogonal to each other. In the present specification, directions along the axes are also referred to as an X-axis direction, a Y-axis direction, and a Z-axis direction. When specifying the direction, a positive direction is "+" and a negative direction is "−" so that positive and negative signs are used together in the direction notation, and description will be performed while a direction to which an arrow faces in each figure is the +direction and an opposite direction thereof is the −direction. In the present embodiment, the Z direction coincides with a vertical direction, the +Z direction indicates vertically downward, and the −Z direction indicates vertically upward. Further, when the positive direction and the negative direction are not limited, the three X, Y, and Z will be described as the X axis, the Y axis, and the Z axis.

As shown in FIG. 1, the liquid discharge device 500 includes a print head 5, an ink tank 550, a transport mechanism 560, a moving mechanism 570, and a control section 540. A signal or the like for controlling the discharge of the ink is supplied to the print head 5 from the control section 540 via a cable 590. The print head 5 discharges the ink supplied from the ink tank 550 at the amount and timing according to the signal supplied from the control section 540. The print head 5 includes a liquid discharge head unit 51 of the present embodiment and a circuit substrate which will be described later. Although not shown in FIG. 1, in the present embodiment, the print head 5 includes a plurality of liquid discharge head units 51. Each liquid discharge head unit 51 is provided with a plurality of liquid discharge heads 510. The number of liquid discharge head unit 51 and liquid discharge head 510 is not limited to plural numbers, and may be a single number.

The liquid discharge head 510 discharges inks of a total of four colors, for example, black, cyan, magenta, and yellow, from the nozzles in the +Z direction to form an image on the printing paper P. The liquid discharge head 510 reciprocates in a main scanning direction with the movement of a carriage 572. In the present embodiment, the main scanning directions are the +X direction and the −X direction. The liquid discharge head 510 may discharge ink of a random color such as light cyan, light magenta, or white, while not being limited to the four colors. The liquid discharge head 510 has a detection resistor 401 and a heating resistor 601.

The ink tank 550 functions as a liquid accommodation section for accommodating ink. The ink tank 550 is coupled to the print head 5 by a resin tube 552, and the ink of the ink tank 550 is supplied to the print head 5 via the tube 552. The ink supplied to the print head 5 is supplied to each liquid discharge head 510. Instead of the ink tank 550, a bag-shaped liquid pack made of a flexible film may be provided.

The transport mechanism 560 transports the printing paper P in a sub-scanning direction. The sub-scanning direction is a direction that intersects the X-axis direction, which is a main scanning direction, and is the +Y direction and the −Y direction in the present embodiment. The transport mechanism 560 includes a transport rod 564, on which three transport rollers 562 are mounted, and a transport motor 566 for rotatably driving the transport rod 564. When the transport motor 566 rotatably drives the transport rod 564, the printing paper P is transported in the +Y direction, which is the sub-scanning direction. The number of the transport rollers 562 is not limited to three and may be a random number. Further, a configuration, in which a plurality of transport mechanisms 560 are provided, may be provided.

The moving mechanism 570 includes a carriage 572, a transport belt 574, a moving motor 576, and a pulley 577. The carriage 572 is mounted with the print head 5 in a state where ink can be discharged. The carriage 572 is fixed to the transport belt 574. The transport belt 574 is bridged between the moving motor 576 and the pulley 577. When the moving motor 576 is rotatably driven, the transport belt 574 reciprocates in the main scanning direction. As a result, the carriage 572 fixed to the transport belt 574 also reciprocates in the main scanning direction.

The control section 540 controls the entire liquid discharge device 500. The control section 540 controls, for example, a reciprocating operation of the carriage 572 along the main scanning direction, a transport operation of the printing paper P along the sub-scanning direction, and a discharge operation of the liquid discharge head 510. The control section 540 also functions as a drive control section for the piezoelectric element 300. In the present embodiment, the control section 540 can further heat the liquid in a pressure chamber 12 by the heating resistor 601 provided in the liquid discharge head 510, and can detect the temperature of the pressure chamber 12 by the detection resistor 401 provided in the liquid discharge head 510. The control section 540 detects the temperature of the pressure chamber 12 and adjusts the temperature of the pressure chamber 12 by heating. The control section 540 controls the discharge of ink to the printing paper P by outputting a drive signal based on the detected temperature of the pressure chamber 12 to the liquid discharge head 510 and driving the piezoelectric element 300. The control section 540 may be composed of, for example, one or a plurality of processing circuits such as a Central Processing Unit (CPU) or a Field Programmable Gate Array (FPGA), and one or a plurality of storage circuits such as a semiconductor memory. In the present embodiment, the control section 540 stores in advance the correspondence relationship between an electric resistance value and the temperature of the detection resistor 401 in the storage circuit.

Figure 2:
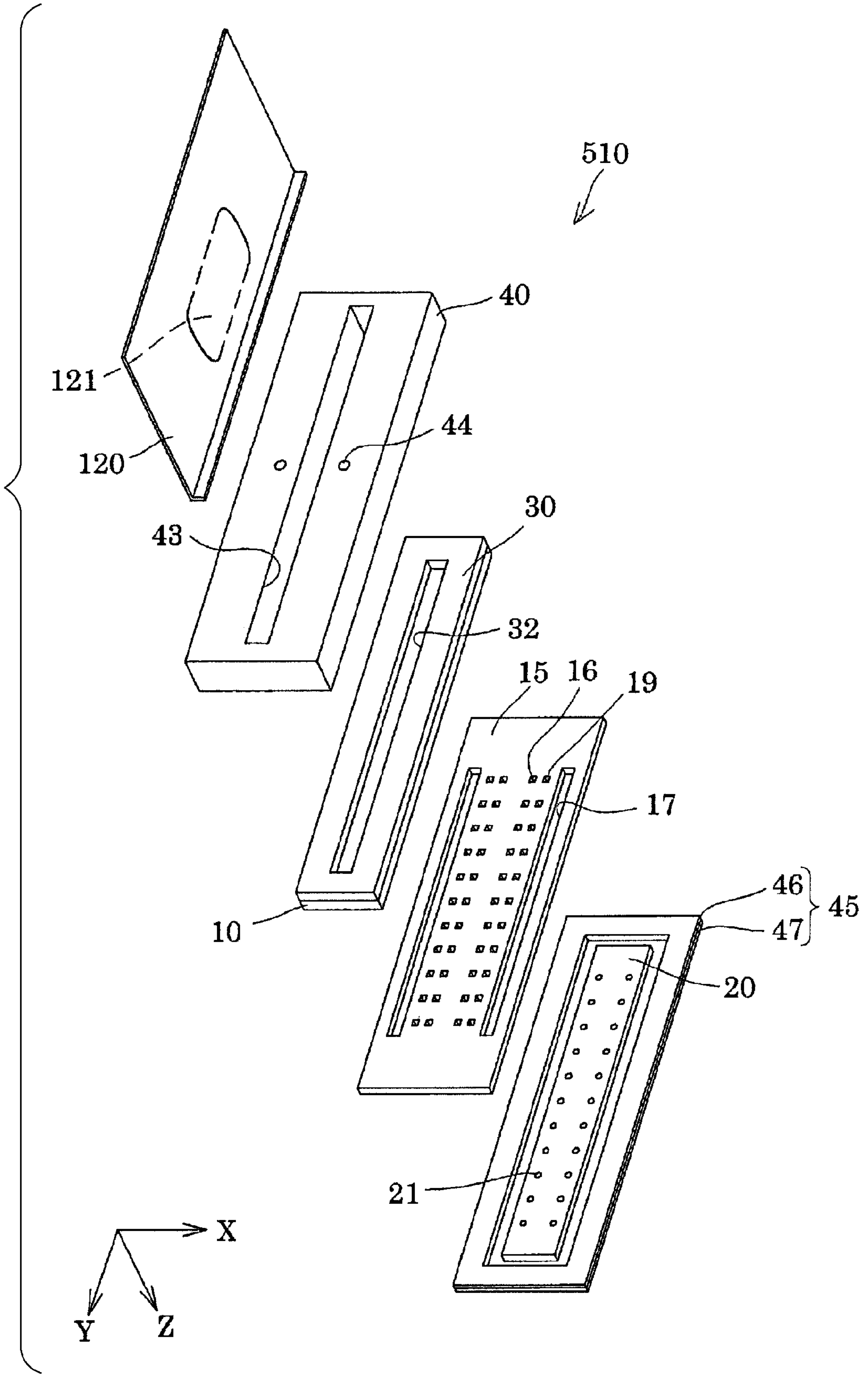
FIG. 2 is an exploded perspective view showing a configuration of a liquid discharge head.
Figure 3:
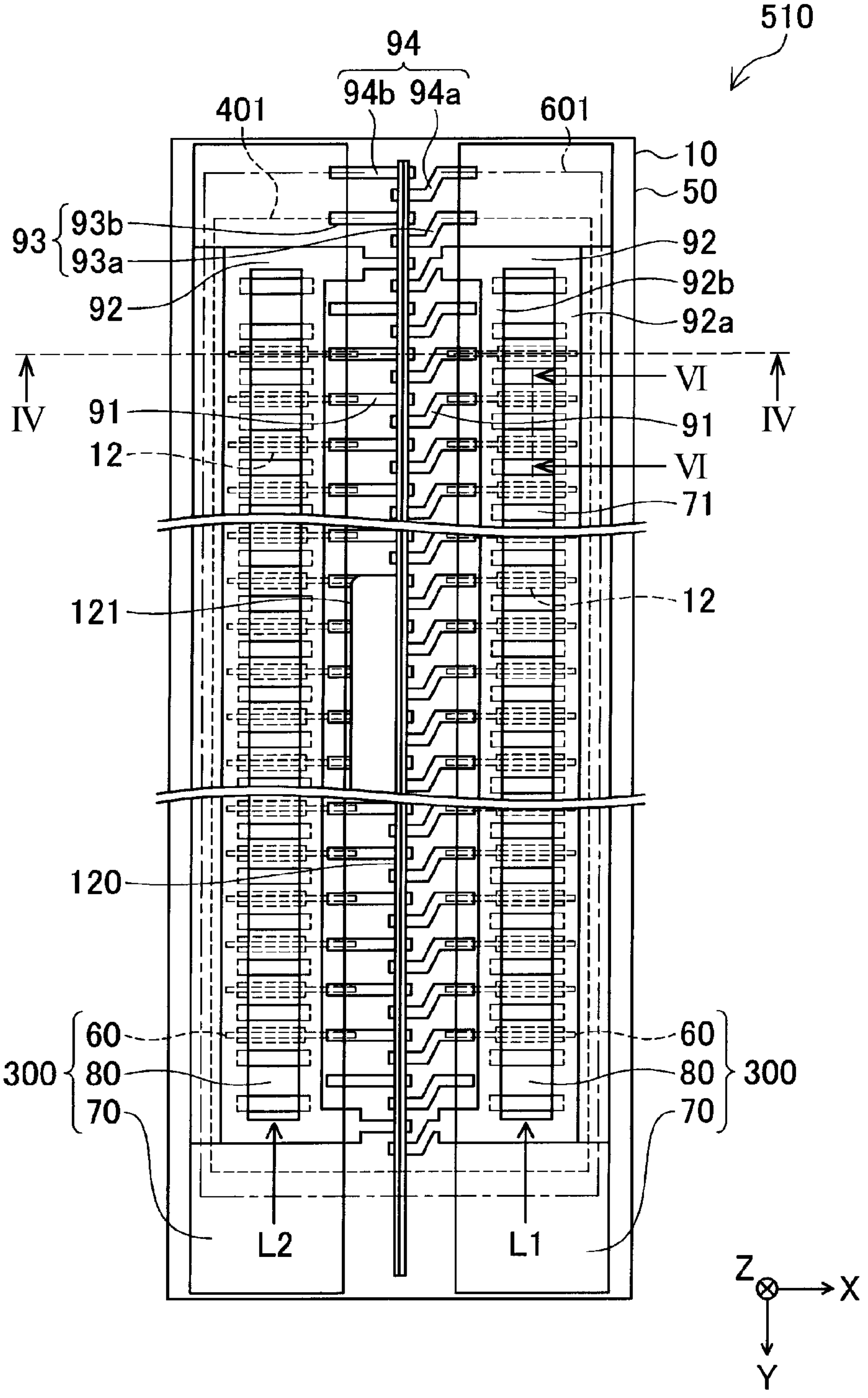
FIG. 3 is an explanatory diagram showing a configuration of a liquid discharge head in a plan view.
Figure 4:
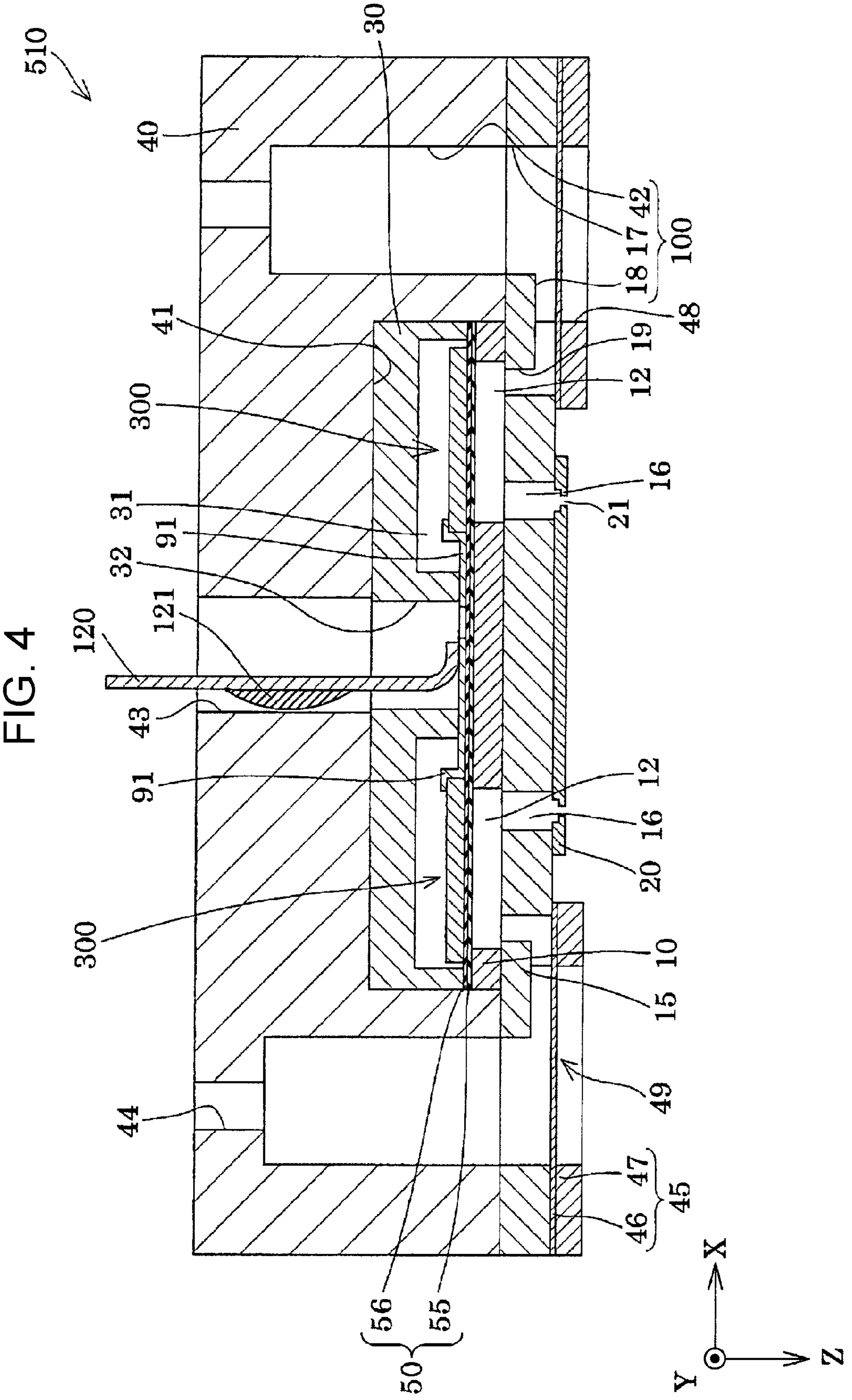
FIG. 4 is a cross-sectional view showing an IV-IV position of FIG. 3.

A detailed configuration of the liquid discharge head 510 will be described with reference to FIGS. 2 to 4. FIG. 2 is an exploded perspective view showing the configuration of the liquid discharge head 510. FIG. 3 is an explanatory diagram showing the configuration of the liquid discharge head 510 in a plan view. FIG. 3 shows a configuration around a pressure chamber substrate 10 in the liquid discharge head 510. In FIG. 3, a protective substrate 30 and a case member 40 are omitted for easy understanding of the technique. FIG. 4 is a cross-sectional view showing an IV-IV position of FIG. 3.

As shown in FIG. 2, the liquid discharge head 510 includes a pressure chamber substrate 10, a communication plate 15, a nozzle plate 20, a compliance substrate 45, a protective substrate 30, a case member 40, and a relay substrate 120. Further, the liquid discharge head 510 includes a piezoelectric element 300 shown in FIG. 3 and a diaphragm 50 shown in FIG. 4. The pressure chamber substrate 10, the communication plate 15, the nozzle plate 20, the compliance substrate 45, the diaphragm 50, the piezoelectric element 300, the protective substrate 30, and the case member 40 are laminated members, and the liquid discharge head 510 is formed by laminating the laminated members. In the present disclosure, a direction in which the laminated members forming the liquid discharge head 510 are laminated is also referred to as a "lamination direction".

The pressure chamber substrate 10 is formed by using, for example, a silicon substrate, a glass substrate, an SOI substrate, various ceramic substrates, and the like. As shown in FIG. 3, a plurality of pressure chambers 12 are arranged in the pressure chamber substrate 10 along a predetermined direction in the pressure chamber substrate 10. The direction in which the plurality of pressure chambers 12 are arranged is also referred to as an "arrangement direction". The pressure chamber 12 is formed in a rectangular shape in which a length in the X-axis direction is longer than a length in the Y-axis direction in a plan view. The shape of the pressure chamber 12 is not limited to the rectangular shape, and may be a parallelogram shape, a polygonal shape, a circular shape, an oval shape, or the like. The oval shape referred to here is a shape in which both end portions in a longitudinal direction are semicircular based on a rectangular shape, and includes a rounded rectangular shape, an elliptical shape, an egg shape, and the like.

In the present embodiment, the plurality of pressure chambers 12 are arranged in two rows each having the Y-axis direction as the arrangement direction. In the example of FIG. 3, the pressure chamber substrate 10 is formed with two pressure chamber rows, that is, a first pressure chamber row L1 having the Y-axis direction as the arrangement direction and a second pressure chamber row L2 having the Y-axis direction as the arrangement direction. The second pressure chamber row L2 is arranged to be adjacent to the first pressure chamber row L1 in a direction intersecting the arrangement direction of the first pressure chamber row L1. The direction intersecting the arrangement direction is also referred to as an "intersection direction". In the example of FIG. 3, the intersection direction is the X-axis direction, and the second pressure chamber row L2 is adjacent to the −X direction of the first pressure chamber row L1. The arrangement direction means a macroscopic arrangement direction of the plurality of pressure chambers 12. For example, a case where a plurality of pressure chambers 12 are arranged along the Y-axis direction according to a so-called staggered arrangement in which every other pressure chamber 12 is alternately disposed in the intersection direction is included in the arrangement direction.

The plurality of pressure chambers 12 belonging to the first pressure chamber row L1 and the plurality of pressure chambers 12 belonging to the second pressure chamber row L2 are formed to have positions which coincide with each other in the arrangement direction, and are disposed to be adjacent to each other in the intersection direction. In each pressure chamber row, the pressure chambers 12 adjacent to each other in the Y-axis direction are partitioned by a partition wall 11 shown in FIG. 6, as will be described later.

As shown in FIG. 2, the communication plate 15, the nozzle plate 20, and the compliance substrate 45 are laminated in order on the +Z direction side of the pressure chamber substrate 10. The communication plate 15 is, for example, a flat plate member using a silicon substrate, a glass substrate, an SOI substrate, various ceramic substrates, a metal substrate, or the like. Examples of the metal substrate include a stainless steel substrate or the like. As shown in FIG. 4, the communication plate 15 is provided with a nozzle communication path 16, a first manifold portion 17, a second manifold portion 18, and a supply communication path 19. It is preferable that the communication plate 15 is formed by using a material having a thermal expansion coefficient substantially the same as a thermal expansion coefficient of the pressure chamber substrate 10. As a result, when the temperatures of the pressure chamber substrate 10 and the communication plate 15 change, it is possible to suppress the warp of the pressure chamber substrate 10 and the communication plate 15 due to a difference in the thermal expansion coefficient.

As shown in FIG. 4, the nozzle communication path 16 is a flow path that communicates the pressure chamber 12 and a nozzle 21. The first manifold portion 17 and the second manifold portion 18 function as a part of a manifold 100 which is a common liquid chamber in which a plurality of pressure chambers 12 communicate with each other. The first manifold portion 17 is provided to penetrate the communication plate 15 in the Z-axis direction. Further, as shown in FIG. 4, the second manifold portion 18 is provided on a surface of the communication plate 15 on the +Z direction side without penetrating the communication plate 15 in the Z-axis direction.

The supply communication path 19 is a flow path communicating with one end portion of the pressure chamber 12 in the X-axis direction. A plurality of supply communication paths 19 are arranged along the Y-axis direction, that is, the arrangement direction, and are individually provided in each of the pressure chambers 12. The supply communication path 19 communicates the second manifold portion 18 with each pressure chamber 12, and supplies the ink in the manifold 100 to each pressure chamber 12.

The nozzle plate 20 is provided on a side opposite to the pressure chamber substrate 10, that is, on a surface of the communication plate 15 on the +Z direction side while interposing the communication plate 15 therebetween. The material of the nozzle plate 20 is not particularly limited, and, for example, a silicon substrate, a glass substrate, an SOI substrate, various ceramic substrates, and a metal substrate can be used. Examples of the metal substrate include a stainless steel substrate or the like. As the material of the nozzle plate 20, an organic substance, such as a polyimide resin, can also be used. However, it is preferable that the nozzle plate 20 uses a material substantially the same as the thermal expansion coefficient of the communication plate 15. As a result, when the temperatures of the nozzle plate 20 and the communication plate 15 change, it is possible to suppress the warp of the nozzle plate 20 and the communication plate 15 due to the difference in the thermal expansion coefficient.

A plurality of nozzles 21 are formed on the nozzle plate 20. Each nozzle 21 communicates with each pressure chamber 12 via the nozzle communication path 16. The plurality of nozzles 21 are arranged along the arrangement direction of the pressure chamber 12, that is, the Y-axis direction. The nozzle plate 20 is provided with two nozzle rows in which the plurality of nozzles 21 are arranged in a row. The two rows of nozzles correspond to the first pressure chamber row L1 and the second pressure chamber row L2, respectively.

As shown in FIG. 4, the compliance substrate 45 is provided together with the nozzle plate 20 on the side opposite to the pressure chamber substrate 10 while interposing the communication plate 15 therebetween, that is, on a surface of the communication plate 15 on the +Z direction side. The compliance substrate 45 is provided around the nozzle plate 20 and covers openings of the first manifold portion 17 and the second manifold portion 18 provided in the communication plate 15. In the present embodiment, the compliance substrate 45 includes a sealing film 46 made of a flexible thin film and a fixed substrate 47 made of a hard material such as metal. As shown in FIG. 4, a region of the fixed substrate 47, which faces the manifold 100, is an opening portion 48 completely removed in a thickness direction. Therefore, one surface of the manifold 100 is a compliance portion 49 sealed only by the sealing film 46.

As shown in FIG. 4, the diaphragm 50 and the piezoelectric element 300 are laminated on a side opposite to the nozzle plate 20 or the like, that is, on a surface of the pressure chamber substrate 10 on the −Z direction side while interposing the pressure chamber substrate 10 therebetween. The piezoelectric element 300 bends and deforms the diaphragm 50 to cause a pressure change in the ink in the pressure chamber 12. In FIG. 4, a configuration of the piezoelectric element 300 is simplified and shown for easy understanding of the technique. The diaphragm 50 is provided on the +Z direction side of the piezoelectric element 300, and the pressure chamber substrate 10 is provided on the +Z direction side of the diaphragm 50.

As shown in FIG. 4, the protective substrate 30 having substantially the same size as the pressure chamber substrate 10 is further bonded to the surface of the pressure chamber substrate 10 on the −Z direction side by an adhesive or the like. The protective substrate 30 has a holding portion 31 which is a space for protecting the piezoelectric element 300. The holding portion 31 is provided for each row of the piezoelectric elements 300 arranged along the arrangement direction, and, in the present embodiment, the holding portions 31 are formed side by side in two rows in the X-axis direction. Further, in the protective substrate 30, a through hole 32 penetrating along the Z-axis direction is provided between the two rows of holding portions 31 arranged side by side in the X-axis direction.

As shown in FIG. 4, the case member 40 is fixed on the protective substrate 30. The case member 40 forms the manifold 100 that communicates with the plurality of pressure chambers 12, together with the communication plate 15. The case member 40 has substantially the same outer shape as the communication plate 15 in a plan view, and is bonded over the protective substrate 30 and the communication plate 15.

The case member 40 has an accommodation section 41, a supply port 44, a third manifold portion 42, and a coupling port 43. The accommodation section 41 is a space having a depth capable of accommodating the pressure chamber substrate 10 and the protective substrate 30. The third manifold portion 42 is a space formed on both outer sides of the accommodation section 41 in the X-axis direction in the case member 40. The manifold 100 is formed by coupling the third manifold portion 42 to the first manifold portion 17 and the second manifold portion 18 provided in the communication plate 15. The manifold 100 has a long shape that is continuous over the Y-axis direction. The supply port 44 communicates with the manifold 100 to supply ink to each manifold 100. The coupling port 43 is a through hole that communicates with the through hole 32 of the protective substrate 30, and a relay substrate 120 is inserted thereto.

As shown in FIG. 4, in the liquid discharge head 510 of the present embodiment, the ink supplied from the ink tank 550 shown in FIG. 1 is taken from the supply port 44, and an internal flow path from the manifold 100 to the nozzle 21 is filled with ink. After that, a voltage based on the drive signal is applied to each of the piezoelectric elements 300 corresponding to the plurality of pressure chambers 12. As a result, the diaphragm 50 bends and deforms together with the piezoelectric element 300, the pressure in each pressure chamber 12 increases, and ink droplets are ejected from each nozzle 21.

Figure 5:
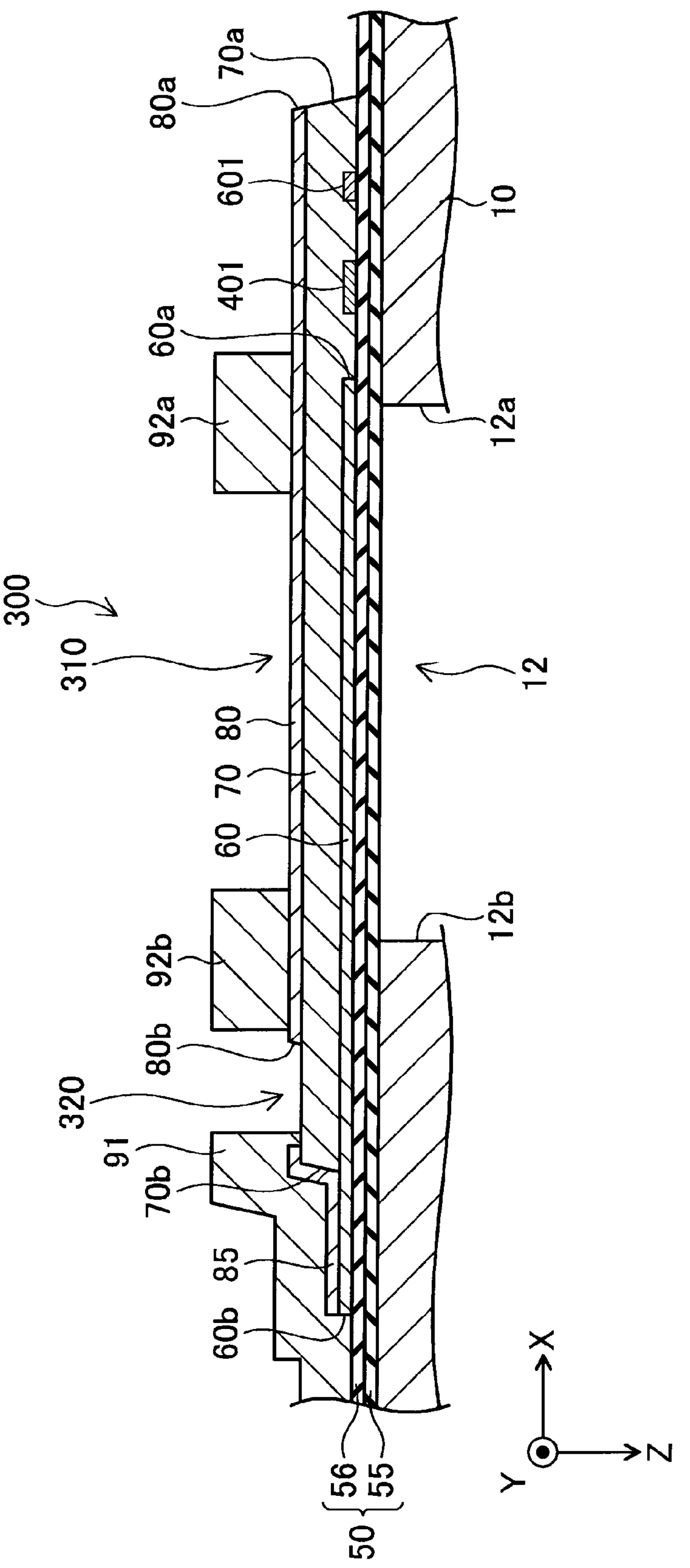
FIG. 5 is an enlarged cross-sectional view showing the vicinity of a piezoelectric element.
Figure 6:
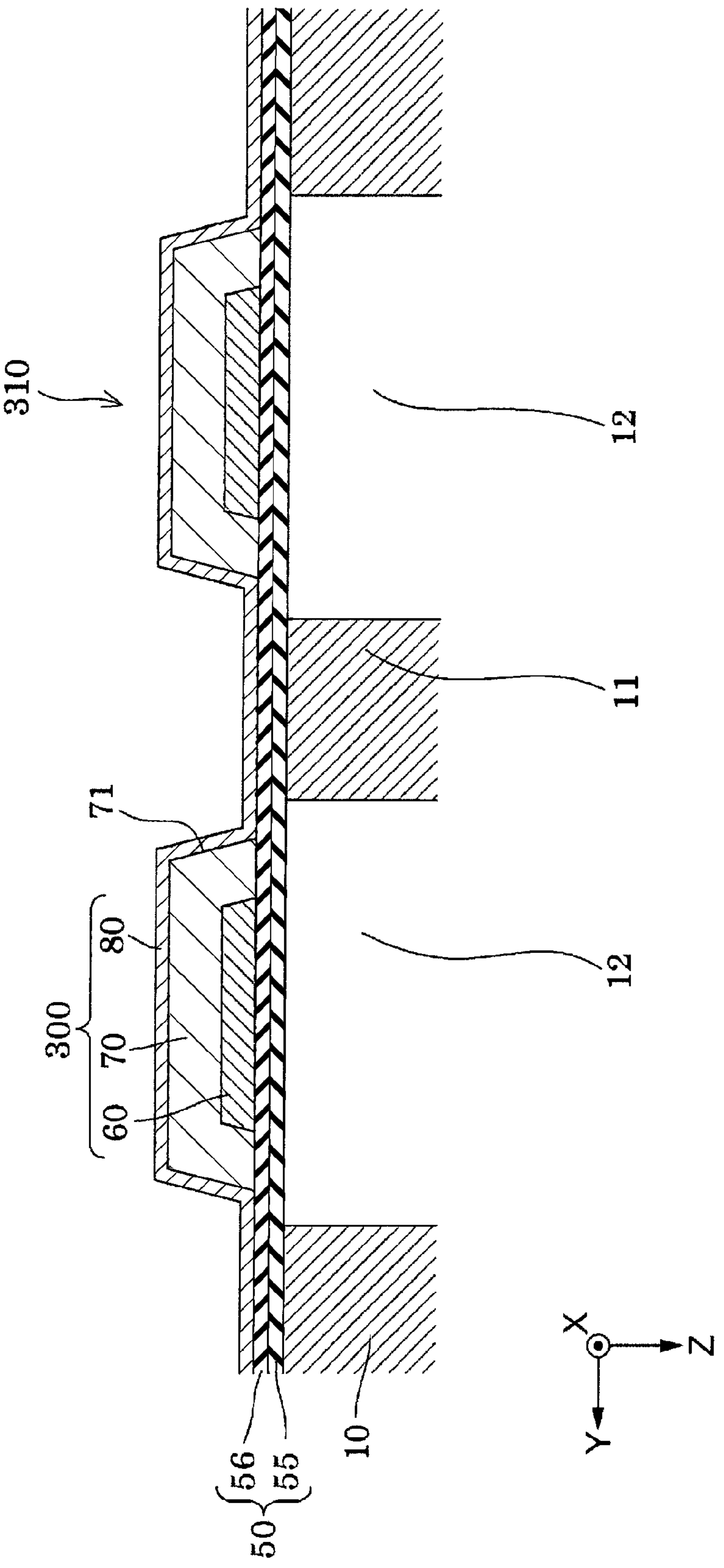
FIG. 6 is a cross-sectional view showing a VI-VI position of FIG. 3.

A configuration of the pressure chamber substrate 10 on the −Z direction side will be described with reference to FIGS. 3 to 6. FIG. 5 is an enlarged cross-sectional view showing the vicinity of the piezoelectric element 300. FIG. 6 is a cross-sectional view showing a VI-VI position of FIG. 3. In addition to the diaphragm 50 and the piezoelectric element 300, the liquid discharge head 510 further has an individual lead electrode 91, a common lead electrode 92, a measurement lead electrode 93, a heating lead electrode 94, a detection resistor 401, and a heating resistor 601 on the −Z direction side of the pressure chamber substrate 10.

As shown in FIGS. 5 and 6, the diaphragm 50 includes an elastic film 55 made of silicon oxide provided on the pressure chamber substrate 10 side, and an insulator film 56 made of a zirconium oxide film provided on the elastic film 55. The flow path, such as the pressure chamber 12, which is formed in the pressure chamber substrate 10 is formed by anisotropic etching the pressure chamber substrate 10 from a surface on the +Z direction side, and a surface of the flow path, such as the pressure chamber 12, on the −Z direction side is made of the elastic film 55. The diaphragm 50 may be composed of, for example, either the elastic film 55 or the insulator film 56, and may further include another film other than the elastic film 55 and the insulator film 56. Examples of the material of the other film include silicon, silicon nitride, and the like.

The piezoelectric element 300 applies pressure to the pressure chamber 12. As shown in FIGS. 5 and 6, the piezoelectric element 300 has a first electrode 60, a piezoelectric body 70, and a second electrode 80. As shown in FIGS. 5 and 6, the first electrode 60, the piezoelectric body 70, and the second electrode 80 are laminated in order from the +Z direction side to the −Z direction side. The piezoelectric body 70 is provided between the first electrode 60 and the second electrode 80 in a lamination direction in which the first electrode 60, the second electrode 80, and the piezoelectric body 70 are laminated, that is, in the Z-axis direction.

Both the first electrode 60 and the second electrode 80 are electrically coupled to the relay substrate 120. The first electrode 60 and the second electrode 80 apply a voltage corresponding to the drive signal to the piezoelectric body 70. A different drive voltage is supplied to the first electrode 60 according to the discharge amount of ink, and a constant reference voltage signal is supplied to the second electrode 80 regardless of the discharge amount of ink. The discharge amount of ink is a volume change amount required for the pressure chamber 12. When the piezoelectric element 300 is driven and a potential difference is generated between the first electrode 60 and the second electrode 80, the piezoelectric body 70 is deformed. Due to the deformation of the piezoelectric body 70, the diaphragm 50 is deformed or vibrated, so that the volume of the pressure chamber 12 changes. Due to the change in the volume of the pressure chamber 12, pressure is applied to the ink accommodated in the pressure chamber 12, and the ink is discharged from the nozzle 21 via the nozzle communication path 16.

As shown in FIG. 5, a part of the piezoelectric element 300, at which piezoelectric distortion occurs in the piezoelectric body 70 when the voltage is applied between the first electrode 60 and the second electrode 80, is referred to as an active portion 310. On the other hand, a part at which the piezoelectric distortion does not occur in the piezoelectric body 70 is referred to as an inactive portion 320. That is, in the piezoelectric element 300, a part at which the piezoelectric body 70 is sandwiched between the first electrode 60 and the second electrode 80 is the active portion 310, and a part at which the piezoelectric body 70 is not sandwiched between the first electrode 60 and the second electrode 80 is the inactive portion 320. When the piezoelectric element 300 is driven, a part that is actually displaced in the Z-axis direction is also referred to as a flexible portion, and a part that is not displaced in the Z direction is also referred to as a non-flexible portion. That is, in the piezoelectric element 300, a part facing the pressure chamber 12 in the Z-axis direction is the flexible portion, and an outer part of the pressure chamber 12 is a non-flexible portion. The active portion 310 is also referred to as a proactive portion, and the inactive portion 320 is also referred to as a passive portion.

For example, the first electrode 60 is formed of a conductive material including a metal, such as platinum (Pt), iridium (Ir), gold (Au), titanium (Ti), and a conductive metal oxide such as indium tin oxide abbreviated as ITO. The first electrode 60 may be formed by laminating a plurality of materials such as platinum (Pt), iridium (Ir), gold (Au), and titanium (Ti). In the present embodiment, platinum (Pt) is used as the first electrode 60.

As shown in FIG. 3, the first electrode 60 is an individual electrode individually provided for the plurality of pressure chambers 12. A width of the first electrode 60 in the Y-axis direction is narrower than a width of the pressure chamber 12. That is, both ends of the first electrode 60 in the Y direction are positioned inside both ends of the pressure chamber 12 in the Y axis direction. As shown in FIG. 5, in the first electrode 60, an end portion 60*a* in the +X direction and an end portion 60*b* in the −X direction are respectively disposed outside the pressure chamber 12. For example, in the first pressure chamber row, the end portion 60*a* of the first electrode 60 is disposed at a position on the +X direction side with respect to the end portion 12*a* of the pressure chamber 12 in the +X direction. The end portion 60*b* of the first electrode 60 is disposed at a position which is the −X direction side rather than the end portion 12*b* of the pressure chamber 12 in the −X direction.

As shown in FIG. 3, the piezoelectric body 70 has a predetermined width in the X-axis direction, and is provided to extend along the arrangement direction of the pressure chambers 12, that is, the Y-axis direction. Examples of the piezoelectric body 70 include a crystal film having a perovskite structure formed on the first electrode 60 and made of a ferroelectric ceramic material exhibiting an electromechanical conversion action, that is, a so-called perovskite type crystal. As the material of the piezoelectric body 70, for example, a ferroelectric piezoelectric material such as lead zirconate titanate (PZT) or a material to which a metal oxide, such as niobium oxide, nickel oxide, or magnesium oxide, is added is used. Specifically, lead titanate (PbTiO3), lead zirconate titanate (Pb(Zr,Ti) O3), lead zirconium acid (PbZrO3), lead lanthanum titanate ((Pb,La),TiO3), lead lanthanum zirconate titanate ((Pb,La)(Zr,Ti)O3), lead magnesium niobate zirconate (Pb(Zr,Ti) (Mg,Nb)O3), or the like can be used. In the present embodiment, lead zirconate titanate (PZT) is used as the piezoelectric body 70.

The material of the piezoelectric body 70 is not limited to the lead-based piezoelectric material containing lead, and a non-lead-based piezoelectric material containing no lead can also be used. Examples of the non-lead-based piezoelectric material include bismuth iron acid ((BiFeO3), abbreviated as "BFO"), barium titanate ((BaTiO3), abbreviated as "BT"), potassium sodium niobate ((K,Na) (NbO3), abbreviated as "KNN"), potassium sodium lithium niobate ((K, Na,Li) (NbO3)), potassium sodium lithium titanate niobate ((K,Na,Li) (Nb,Ta)O3), bismuth potassium titanate ((Bi1/2K1/2)TiO3, abbreviated as "BKT"), bismuth sodium titanate ((Bi1/2Na1/2)TiO3, abbreviated as "BNT"), bismuth manganate (BimnO3, abbreviated as "BM"), composite oxide containing bismuth, potassium, titanium and iron and having a perovskite structure (x[(BixK1-x)TiO3]-(1-x) [BiFeO3], abbreviated as "BKT-BF"), composite oxide containing bismuth, iron, barium and titanium and having a perovskite structure ((1-x)[BiFeO3]-x[BaTiO3], abbreviated as "BFO-BT"), and a material ((1-x)[Bi(Fe1-yMy)O3]-x[BaTiO3] (M is Mn, Co, or Cr)), which is obtained by adding metals, such as manganese, cobalt, and chromium, to the composite oxide.

The thickness of the piezoelectric body 70 is formed, for example, from approximately 1000 nanometers to 4000 nanometers. As shown in FIG. 5, the width of the piezoelectric body 70 in the X-axis direction is longer than the length in the X-axis direction which is the longitudinal direction of the pressure chamber 12. Therefore, on both sides of the pressure chamber 12 in the X-axis direction, the piezoelectric body 70 extends to the outside of the pressure chamber 12. As described above, the piezoelectric body 70 extends to the outside of the pressure chamber 12 in the X-axis direction, so that the strength of the diaphragm 50 is improved. Therefore, when the active portion 310 is driven to displace the piezoelectric element 300, it is possible to suppress the occurrence of cracks or the like in the diaphragm 50 or the piezoelectric element 300.

As shown in FIG. 5, the end portion 70*a* of the piezoelectric body 70 in the +X direction is positioned on the +X direction side, which is an outer side than the end portion 60*a* of the first electrode 60 in the first pressure chamber row. That is, the end portion 60*a* of the first electrode 60 is covered with the piezoelectric body 70. On the other hand, the end portion 70*b* of the piezoelectric body 70 in the −X direction is positioned on the +X direction side which is the inside rather than the end portion 60*b* of the first electrode 60, and the end portion 60*b* of the first electrode 60 is not covered with the piezoelectric body 70.

As shown in FIGS. 3 and 6, the piezoelectric body 70 is formed with a groove portion 71, which is a part thinner than the other regions. As shown in FIG. 6, the groove portion 71 is provided at a position corresponding to each partition wall 11. The groove portion 71 is formed by completely removing the piezoelectric body 70 in the Z-axis direction. The piezoelectric body 70 may be formed on a bottom surface of the groove portion 71 to be thinner than other parts. The width of the groove portion 71 in the Y-axis direction is formed to be the same as or wider than the width of the partition wall 11 in the Y-axis direction. As shown in FIG. 3, the groove portion 71 has a substantially rectangular appearance shape in a plan view. By providing the groove portion 71 in the piezoelectric body 70, the rigidity of a part of the diaphragm 50 facing the end portion of the pressure chamber 12 in the Y-axis direction, that is, a so-called arm portion of the diaphragm 50 is suppressed, so that the piezoelectric element 300 can be displaced better. The groove portion 71 is not limited to the rectangular shape, and may have a polygonal shape of pentagon or more, a circular shape, an elliptical shape, or the like.

As shown in FIGS. 5 and 6, the second electrode 80 is provided on an opposite side of the first electrode 60 while interposing the piezoelectric body 70, that is, on the −Z direction side of the piezoelectric body 70. As shown in FIG. 3, the second electrode 80 is a common electrode that is commonly provided for the plurality of pressure chambers 12 and is common to the plurality of active portions 310. The material of the second electrode 80 is not particularly limited, but, like the first electrode 60, for example, metals, such as platinum (Pt), iridium (Ir), gold (Au), and titanium (Ti), and conductive materials including conductive metal oxides, such as indium tin oxide abbreviated as ITO, are used. Alternatively, a plurality of materials such as platinum (Pt), iridium (Ir), gold (Au), and titanium (Ti) may be laminated and formed. In the present embodiment, iridium (Ir) is used as the second electrode 80.

As shown in FIG. 3, the second electrode 80 has a predetermined width in the X-axis direction, and is provided to extend along the arrangement direction of the pressure chambers 12, that is, the Y-axis direction. As shown in FIG. 6, the second electrode 80 is also provided on the insulator film 56 which is a side surface of the groove portion 71 of the piezoelectric body 70 and is a bottom surface of the groove portion 71.

As shown in FIG. 5, the end portion 80*a* of the second electrode 80 in the +X direction is disposed on an outer side than the end portion 60*a* of the first electrode 60 covered with the piezoelectric body 70, that is, on the +X direction side. The end portion 80*a* of the second electrode 80 is positioned on an outer side than the end portion 12*a* of the pressure chamber 12 and an outer side than the end portion 60*a* of the first electrode 60. In the present embodiment, the end portion 80*a* of the second electrode 80 substantially coincides with the end portion 70*a* of the piezoelectric body 70 in the X-axis direction. As a result, at end portion of the active portion 310 in the +X direction, the boundary between the active portion 310 and the inactive portion 320 is defined by the end portion 60*a* of the first electrode 60.

As shown in FIG. 5, the end portion 80*b* of the second electrode 80 in the −X direction is disposed on the −X direction side, which is an outer side than the end portion 12*b* of the pressure chamber 12 in the −X direction, and is disposed on the +X direction side, which is an inner side than the end portion 70*b* of the piezoelectric body 70. The end portion 70*b* of the piezoelectric body 70 is positioned inside which is the +X direction side with respect to the end portion 60*b* of the first electrode 60. Therefore, the end portion 80*b* of the second electrode 80 is positioned on the piezoelectric body 70 which is on the +X direction side with respect to the end portion 60*b* of the first electrode 60. On the −X direction side of the end portion 80*b* of the second electrode 80, there is a part at which a surface of the piezoelectric body 70 is exposed. As described above, the end portion 80*b* of the second electrode 80 is disposed on the +X direction side with respect to the end portion 70*b* of the piezoelectric body 70 and the end portion 60*b* of the first electrode 60. Therefore, at the end portion of the active portion 310 in the −X direction, the boundary between the active portion 310 and the inactive portion 320 is defined by the end portion 80*b* of the second electrode 80.

On the outside of the end portion 80*b* of the second electrode 80, a wiring portion 85 which is in the same layer as the second electrode 80 but is electrically discontinuous with the second electrode 80 is provided. The wiring portion 85 is formed from the vicinity of the end portion 70*b* of the piezoelectric body 70 to the end portion 60*b* of the first electrode 60 in a state of being spaced from the end portion 80*b* of the second electrode 80. The wiring portion 85 is provided for each active portion 310. That is, a plurality of wiring portions 85 are disposed at predetermined intervals along the Y-axis direction. The wiring portion 85 is preferably formed in the same layer as the second electrode 80. As a result, the cost can be reduced by simplifying a manufacturing process of the wiring portion 85. However, the wiring portion 85 may be formed in a layer different from the layer of the second electrode 80.

As shown in FIG. 5, the individual lead electrode 91 is coupled to the first electrode 60 which is an individual electrode, and the common lead electrode 92, which is a common electrode for drive, is electrically coupled to the second electrode 80, which is a common electrode, respectively. The individual lead electrode 91 and the common lead electrode 92 function as drive wirings for applying a voltage for driving the piezoelectric body 70 to the piezoelectric body 70. In the present embodiment, a power supply circuit for supplying electric power to the piezoelectric body 70 via the drive wiring and a power supply circuit for supplying electric power to the heating resistor 601 and the detection resistor 401 are different circuits from each other.

As shown in FIGS. 3 and 4, the individual lead electrode 91 and the common lead electrode 92 are extended to be exposed in the through hole 32 formed in the protective substrate 30, and are electrically coupled to the relay substrate 120 in the through hole 32. The relay substrate 120 is formed with a plurality of wirings for coupling a control substrate 580 and a power supply circuit (not shown). In the present embodiment, the relay substrate 120 is composed of, for example, a Flexible Printed Circuit (FPC). In addition, the relay substrate 120 may be composed of any flexible substrate, such as Flexible Flat Cable (FFC), instead of FPC.

An integrated circuit 121 having a switching element is mounted at the relay substrate 120. A signal for driving the piezoelectric element 300 propagating at the relay substrate 120 is input to the integrated circuit 121. The integrated circuit 121 controls a timing at which the signal for driving the piezoelectric element 300 is supplied to the first electrode 60 based on the input signal. As a result, the timing at which the piezoelectric element 300 is driven and the drive amount of the piezoelectric element 300 are controlled.

The materials of the individual lead electrode 91 and the common lead electrode 92 are conductive materials. For example, gold (Au), copper (Cu), titanium (Ti), tungsten (W), nickel (Ni), chromium (Cr), platinum (Pt), aluminum (Al), and the like can be used. In the present embodiment, gold (Au) is used as the individual lead electrode 91 and the common lead electrode 92. Further, the individual lead electrode 91 and the common lead electrode 92 may have an adhesion layer for improving the adhesion with the first electrode 60, the second electrode 80, and the diaphragm 50.

The individual lead electrode 91 and the common lead electrode 92 are formed in the same layer, but are formed so as to be electrically discontinuous. As a result, the cost can be reduced by simplifying the manufacturing process as compared with a case where the individual lead electrode 91 and the common lead electrode 92 are individually formed. The individual lead electrode 91 and the common lead electrode 92 may be formed in different layers.

The individual lead electrode 91 is provided for each active portion 310, that is, for each first electrode 60. As shown in FIG. 5, for example, the individual lead electrode 91 is coupled to the vicinity of the end portion 60*b* of the first electrode 60 via the wiring portion 85 in the first pressure chamber row L1, and is pulled out in the −X direction up to a top of the diaphragm 50.

As shown in FIG. 3, for example, in the first pressure chamber row L1, the common lead electrode 92 is pulled out in the −X direction from the second electrode 80 to the diaphragm 50 at both end portions in the Y-axis direction. The common lead electrode 92 has an extension portion 92*a* and an extension portion 92*b*. As shown in FIG. 5, for example, in the first pressure chamber row, the extension portion 92*a* is extended along the Y-axis direction in a region corresponding to the end portion 12*a* of the pressure chamber 12, and the extension portion 92*b* is extended along the Y-axis direction to a region corresponding to the end portion 12*b* of the pressure chamber 12. The extension portion 92*a* and the extension portion 92*b* are continuously provided with respect to the plurality of active portions 310 in the Y-axis direction.

The extension portion 92*a* and the extension portion 92*b* extend from an inside of the pressure chamber 12 to an outside of the pressure chamber 12 in the X-axis direction. In the present embodiment, the active portion 310 of the piezoelectric element 300 extends to the outside of the pressure chamber 12 at both end portions of the pressure chamber 12 in the X-axis direction, and the extension portion 92*a* and the extension portion 92*b* extend to the outside of the pressure chamber 12 on the active portion 310.

As shown in FIGS. 3 and 5, the heating resistor 601 is provided on a surface of the diaphragm 50 on the −Z direction side, specifically, on the surface of the diaphragm 50 on the −Z direction side. Specifically, the heating resistor 601 is positioned between the diaphragm 50 and the piezoelectric body 70 in the Z-axis direction, and is covered with the piezoelectric body 70. The heating resistor 601 is a conductor wiring used for heating the inside of the pressure chamber 12. In the present embodiment, the heating resistor 601 heats the liquid in the pressure chamber 12 by utilizing resistance heating generated by causing an electric current to flow through an electric resistor such as a metal or a semiconductor.

Various heating elements can be used as a material of the heating resistor 601. As the heating element, metal heating elements, which include gold (Au), platinum (Pt), iridium (Ir), aluminum (Al), copper (Cu), titanium (Ti), tungsten (W), nickel (Ni), chromium (Cr), or the like, can be used. The heating resistor 601 may be formed of a non-metal heating element such as silicon carbide, molybdenum silicide, or carbon. In the present embodiment, the heating resistor 601 is disposed at the same position as the first electrode 60 in the lamination direction, that is, in the same layer as the first electrode 60, and is formed so as to be electrically discontinuous with the first electrode 60. The material of the heating resistor 601 is platinum (Pt), which is the same as that of the first electrode 60. As a result, the cost can be reduced by simplifying the manufacturing process as compared with a case where the heating resistor 601 is formed separately from the first electrode 60. The heating resistor 601 may be formed in a layer different from that of the first electrode 60.

As shown in FIG. 3, a part of the heating resistor 601 is formed in a linear shape along the first pressure chamber row L1, and is disposed on the +X direction side with respect to the pressure chamber 12 included in the first pressure chamber row L1, that is, outside the liquid discharge head 510 in the intersection direction. In the present embodiment, the other part of the heating resistor 601 is formed in a linear shape along the second pressure chamber row L2, and is disposed on the −X direction side with respect to the pressure chamber 12 included in the second pressure chamber row L2, that is, outside the liquid discharge head 510 in the intersection direction. As described above, in the present embodiment, the heating resistor 601 is continuously formed on an outside of the liquid discharge head 510 so as to surround the periphery of the first pressure chamber row L1 and the second pressure chamber row L2.

FIG. 3 shows a heating lead electrode 94 including a heating lead electrode 94*a* and a heating lead electrode 94*b*. The heating lead electrode 94 functions as a coupling portion for coupling the heating resistor 601 and the relay substrate 120. One end of the heating resistor 601 is coupled to the heating lead electrode 94*a*, the other end of the heating resistor 601 is coupled to the heating lead electrode 94*b*. As a result, the heating resistor 601 is electrically coupled to the relay substrate 120, and the control section 540 can apply a heating voltage that causes the heating resistor 601 to generate resistance heating to the heating resistor 601. In the example of FIG. 3, the heating resistor 601 is formed in a linear shape, but the shape is not limited thereto. For example, the heating resistor 601 may be formed as a so-called meandering pattern in which the heating resistor 601 is reciprocated a plurality of times in the vicinity of the first pressure chamber row L1 and the second pressure chamber row L2.

In the present embodiment, the heating lead electrode 94 is formed in the same layer as the individual lead electrode 91 and the common lead electrode 92, and is formed so as to be electrically discontinuous. The material of the heating lead electrode 94 is a conductive material, and includes, for example, gold (Au), copper (Cu), titanium (Ti), tungsten (W), nickel (Ni), chromium (Cr), platinum (Pt), aluminum (Al), and the like. In the present embodiment, gold (Au) is used as the heating lead electrode 94. The material of the heating lead electrode 94 is the same as the materials of the individual lead electrode 91 and the common lead electrode 92. The heating lead electrode 94 may have an adhesion layer that improves adhesion to the heating resistor 601 and the diaphragm 50.

As shown in FIG. 5, in the present embodiment, the detection resistor 401 is further provided on the surface of the diaphragm 50 on the −Z direction side. Specifically, the detection resistor 401 is positioned between the diaphragm 50 and the piezoelectric body 70 in the Z-axis direction, and is covered with the piezoelectric body 70. That is, the detection resistor 401 is disposed at the same position as the piezoelectric element 300, that is, in the same layer as the piezoelectric element 300 in the lamination direction of the piezoelectric element 300 with respect to the pressure chamber substrate 10. The detection resistor 401 is a conductor wiring used for detecting the temperature of the pressure chamber 12. In the present embodiment, the temperature of the detection resistor 401 is detected by using the characteristic that an electric resistance value of a metal, a semiconductor, or the like changes depending on the temperature. The control section 540 measures the electric resistance value of the detection resistor 401 when driving the piezoelectric element 300, and detects the temperature of the pressure chamber 12 based on the correspondence relationship between the electric resistance value and the temperature of the detection resistor 401.

The material of the detection resistor 401 is a material whose electric resistance value is temperature dependent. For example, gold (Au), platinum (Pt), iridium (Ir), aluminum (Al), copper (Cu), titanium (Ti), tungsten (W), nickel (Ni), chromium (Cr), and the like can be used. Here, platinum (Pt) can be preferably used as a material for the detection resistor 401 from a viewpoint that the change in electric resistance with temperature is large and stability and accuracy are high. The electric resistance value is an example of a measured value of the detection resistor to be measured. In the present embodiment, the detection resistor 401 is in the same layer as the heating resistor 601 and the first electrode 60 in the lamination direction, and is formed so as to be electrically discontinuous with the heating resistor 601 and the first electrode 60. The material of the detection resistor 401 is the same platinum (Pt) as the heating resistor 601 and the first electrode 60. As a result, the cost can be reduced by simplifying the manufacturing process as compared with a case where the detection resistor 401 is formed separately from the heating resistor 601 and the first electrode 60. The detection resistor 401 may be formed in a layer different from the layers of the heating resistor 601 and the first electrode 60.

As shown in FIG. 3, in the present embodiment, the detection resistor 401 is continuously formed so as to surround the periphery of the first pressure chamber row L1 and the second pressure chamber row L2. FIG. 3 shows a measurement lead electrode 93 including a measurement lead electrode 93*a* and a measurement lead electrode 93*b*. The measurement lead electrode 93 functions as a coupling portion for coupling the detection resistor 401 and the relay substrate 120. One end of the detection resistor 401 is coupled to the measurement lead electrode 93*a*, and the other end of the detection resistor 401 is coupled to the measurement lead electrode 93*b*. As a result, the detection resistor 401 is electrically coupled to the relay substrate 120, and the control section 540 can detect the electric resistance value of the detection resistor 401. In the example of FIG. 3, the detection resistor 401 is formed in a linear shape, but is not limited thereto, and, for example, may be formed as a so-called meandering pattern in which the detection resistor 401 is reciprocated a plurality of times in the vicinity of the first pressure chamber row L1 and the second pressure chamber row L2. With the configuration, the temperature detection accuracy of the pressure chamber 12 can be improved.

In the present embodiment, the measurement lead electrode 93 is formed in the same layer as the individual lead electrode 91 and the common lead electrode 92, and is formed to be electrically discontinuous. The material of the measurement lead electrode 93 is a conductive material, and includes, for example, gold (Au), copper (Cu), titanium (Ti), tungsten (W), nickel (Ni), chromium (Cr), platinum (Pt), aluminum (Al), and the like. In the present embodiment, gold (Au) is used as the measurement lead electrode 93. The material of the measurement lead electrode 93 is the same as the materials of the individual lead electrode 91 and the common lead electrode 92. The measurement lead electrode 93 may have an adhesion layer that improves adhesion to the detection resistor 401 and the diaphragm 50.

As shown in FIG. 3, a part of the detection resistor 401 is formed in a linear shape along the arrangement direction of the pressure chambers 12 in the first pressure chamber row L1, and is disposed on the +X direction side rather than the pressure chambers 12 included in the first pressure chamber row L1, that is, on an outer side of the liquid discharge head 510 in the intersection direction. In the present embodiment, the other part of the detection resistor 401 is formed in a linear shape along the arrangement direction of the pressure chambers 12 in the second pressure chamber row L2, and is disposed on the −X direction side rather than the pressure chambers 12 included in the second pressure chamber row L2, that is, on an outer side of the liquid discharge head 510 in the intersection direction. As described above, in the present embodiment, the detection resistor 401 is continuously formed on the outside of the liquid discharge head 510 so as to surround the periphery of the first pressure chamber row L1 and the second pressure chamber row L2. The detection resistor 401 is disposed on an inner side of the liquid discharge head 510 rather than the heating resistor 601. The temperature detection accuracy of the pressure chamber 12 by the detection resistor 401 can be improved by disposing the detection resistor 401 at a position close to the pressure chamber 12.

Figure 7:
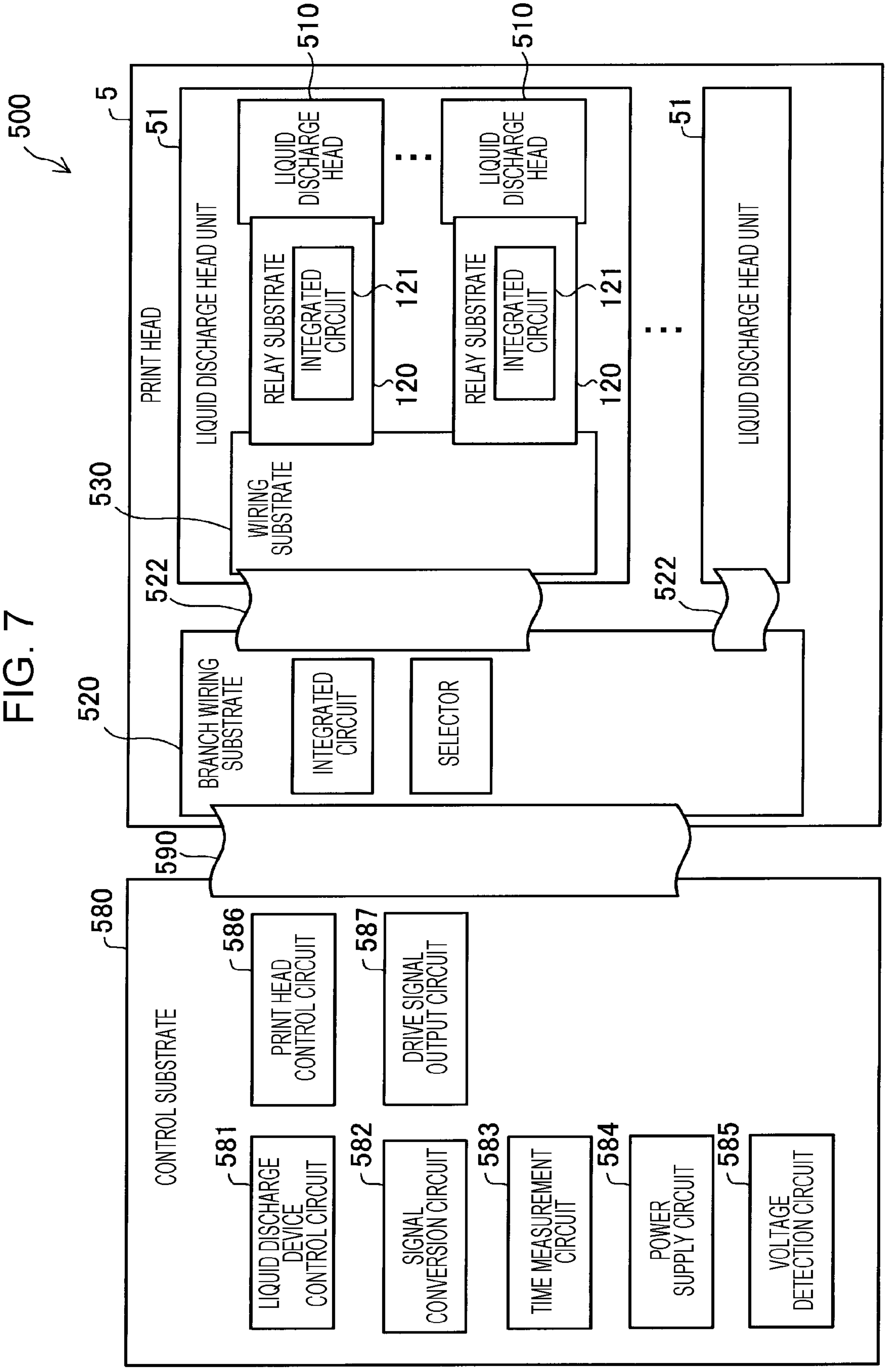
FIG. 7 is a block diagram showing a functional configuration of the liquid discharge device.
Figure 8:
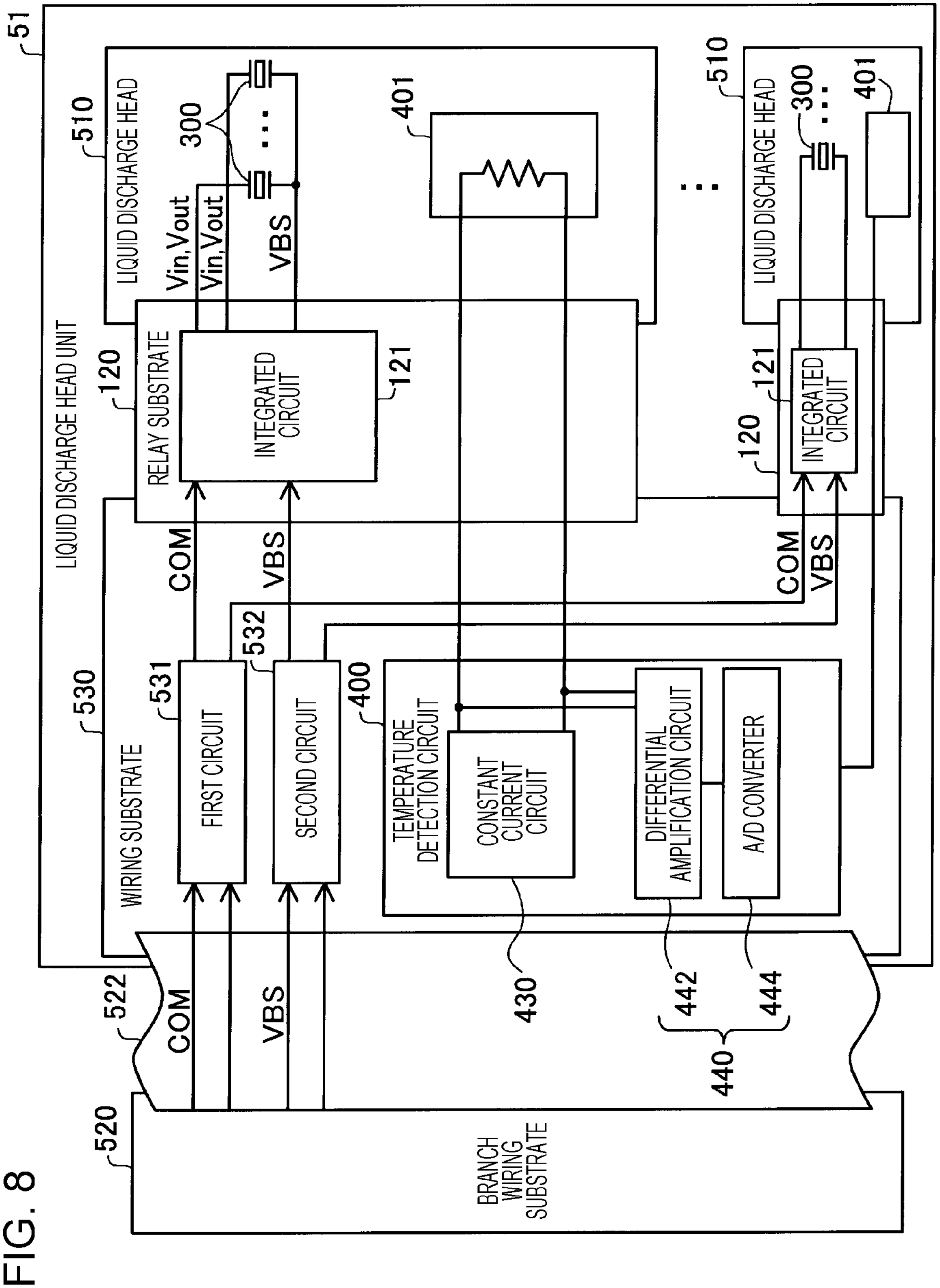
FIG. 8 is a block diagram showing a functional configuration of a liquid discharge head unit.
Figure 9:
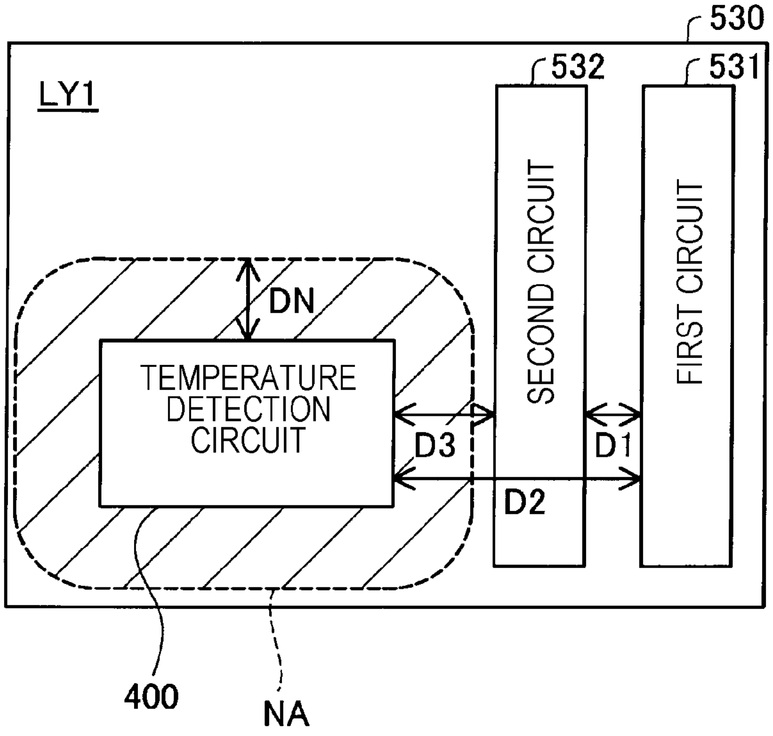
FIG. 9 is an explanatory diagram schematically showing a dispositional position of a temperature detection circuit at a wiring substrate.

With reference to FIGS. 7 to 9, a functional configuration and a disposition method of the circuit substrate provided in the liquid discharge device 500 of the present embodiment will be described. FIG. 7 is a block diagram showing the functional configuration of the liquid discharge device 500. As shown in FIG. 7, the liquid discharge device 500 includes the print head 5 and the control substrate 580. The control substrate 580 is a substrate including a hardware logic circuit for realizing a function of the control section 540 described above. The control substrate 580 is formed by using a rigid substrate, and is disposed at a position different from a position of the print head 5 in a main body of the liquid discharge device 500. In the present embodiment, the control substrate 580 is separated from a wiring substrate 530, thereby reducing or suppressing heat transfer from each electronic circuit of the control substrate 580 to the temperature detection circuit 400. As shown in FIG. 7, the print head 5 has a plurality of liquid discharge head units 51, and each of the liquid discharge head units 51 has a plurality of liquid discharge heads 510. In addition, in FIG. 7 and later, the ink tank 550, the transport mechanism 560, and the moving mechanism 570 are not shown in the drawing.

The control substrate 580 and the print head 5 are communicably coupled to each other via the cable 590. In the present embodiment, a terminal group provided on the control substrate 580 and a terminal group provided on the branch wiring substrate 520 included in the print head 5 are electrically coupled to each other via the cable 590. As the cable 590, various cables, such as a Flexible Flat Cable (FFC) and a coaxial cable, are used according to a form of a propagated signal. The cable 590 may be an optical communication cable that propagates an optical signal.

The control substrate 580 generates a signal for controlling each configuration of the liquid discharge device 500 based on image data input from a host computer or the like provided outside the liquid discharge device 500, and outputs the signal to the corresponding configuration. The control substrate 580 includes a liquid discharge device control circuit 581, a signal conversion circuit 582, a time measurement circuit 583, a power supply circuit 584, a voltage detection circuit 585, a print head control circuit 586, and a drive signal output circuit 587. The control substrate 580 is not limited to be composed of one substrate, and may be composed of a plurality of substrates. For example, at least some of the plurality of circuits mounted on the control substrate 580 including the liquid discharge device control circuit 581, the signal conversion circuit 582, the time measurement circuit 583, the power supply circuit 584, the voltage detection circuit 585, the print head control circuit 586, and the drive signal output circuit 587 may be mounted on different substrates and may be electrically coupled to each other via a connector, a cable, or the like (not shown).

The commercial power supply is input to the power supply circuit 584. The power supply circuit 584 converts the input commercial power supply into a DC voltage of, for example, 42 V and outputs the DC voltage. The DC voltage output from the power supply circuit 584 is input to the voltage detection circuit 585, and is also used as the power supply voltage of each configuration of the liquid discharge device 500. Here, each configuration of the liquid discharge device 500 may use the output DC voltage as the power supply voltage and the drive voltage without change, or may use a voltage signal converted into various voltage values, such as 3.3 V, 5 V, and 7.5 V, by a voltage conversion circuit (not shown) as a power supply voltage and a drive voltage.

The voltage detection circuit 585 detects whether or not a power supply voltage, such as a commercial power supply, is supplied to the liquid discharge device 500 based on the voltage value of the DC voltage output from the power supply circuit 584. Then, the voltage detection circuit 585 generates a voltage detection signal at a logic level according to the detection result, and outputs the voltage detection signal to the time measurement circuit 583.

The time measurement circuit 583 determines whether or not the power supply voltage is supplied to the liquid discharge device 500 based on the input voltage detection signal. When the time measurement circuit 583 determines that the power supply voltage is supplied to the liquid discharge device 500 based on the voltage detection signal, elapsed time information is generated and output to the liquid discharge device control circuit 581.

The liquid discharge device control circuit 581 generates various signals for controlling an operation of each of the portions of the liquid discharge device 500 and outputs the signals to each of the portions of the liquid discharge device 500. A print head operation information signal including a drive situation of the print head 5 is input from the print head control circuit 586 to the liquid discharge device control circuit 581.

The print head control circuit 586 generates a drive data signal for driving the plurality of piezoelectric elements 300 included in the print head 5, a print data signal SI for controlling a timing of supplying a drive signal COM to the piezoelectric element 300, a clock signal SCK, a latch signal LAT, a change signal CH, and a switching signal SW. The print data signal SI, the clock signal SCK, the latch signal LAT, the change signal CH, and the switching signal SW, which are generated by the print head control circuit 586, are input to the print head 5 via the cable 590. The print head control circuit 586 generates and outputs the print data signal SI and the switching signal SW which correspond to each of the plurality of liquid discharge heads 510 included in the print head 5. The print head control circuit 586 generates the drive data signal that defines a waveform of the drive signal COM for driving the piezoelectric element 300, and outputs the drive data signal to the drive signal output circuit 587.

The drive signal output circuit 587 generates the drive signal COM by performing digital/analog signal conversion on each input drive data signal and then performing class D amplification on the analog signal obtained through the conversion based on the DC voltage. In other words, the drive data signal is a digital signal that defines the waveform of the drive signal COM, and the drive signal output circuit 587 generates the drive signal COM, which has a maximum voltage value sufficient to drive the piezoelectric element 300 and whose voltage value changes, by performing the class D amplification on the waveform defined by the drive data signal based on the DC voltage. The drive signal COM is input to the print head 5 via the cable 590. The drive data signal may be any signal that can define the waveform of the drive signal COM, and may be, for example, an analog signal. The drive signal output circuit 587 may amplify the waveform defined by the drive data signal, and may include, for example, a class A amplification circuit, a class B amplification circuit, a class AB amplification circuit, or the like.

The print head control circuit 586 outputs a memory control signal for controlling the memory included in the branch wiring substrate 520 which will be described later. Examples of the control of the memory include a read process for reading information stored in the memory, a write process for writing information to the memory, and the like. When the memory control signal is output, the stored data signal corresponding to the information read from the memory is input to the print head control circuit 586.

As shown in FIG. 7, the print head 5 has a branch wiring substrate 520 and a plurality of liquid discharge head units 51. The branch wiring substrate 520 is electrically coupled to each of the plurality of liquid discharge head units 51 via the cable 522. All the plurality of liquid discharge head units 51 included in the print head 5 have the same configuration.

The drive signal COM, the print data signal SI, the clock signal SCK, the latch signal LAT, the change signal CH, and the switching signal SW are input to the branch wiring substrate 520 from the control substrate 580 via the cable 590. Each of the drive signal COM, the print data signal SI, the clock signal SCK, the latch signal LAT, the change signal CH, and the switching signal SW propagates through the branch wiring substrate 520 and is then input to the corresponding liquid discharge head unit 51.

The branch wiring substrate 520 has an integrated circuit including a memory and a selector. The selector is provided to correspond to each liquid discharge head unit 51. For example, a print data signal SI, a memory control signal MC, a latch signal LAT, and a change signal CH input from the control substrate 580 are input to the selector. According to the logic levels of the input latch signal LAT and the change signal CH, the selector selects whether to output the print data signal SI, the latch signal LAT, and the change signal CH to the liquid discharge head unit 51 or to output the memory control signal MC, the latch signal LAT, and the change signal CH to the memory. The memory stores information indicating an operating state of the print head 5 and threshold value information for determining whether or not to update the information. The memory in the present embodiment is a non-volatile memory that can be erased by ultraviolet rays, and, specifically, One-Time-PROM, EPROM, or the like is used. The memory is controlled by the memory control signal MC, the clock signal SCK, the latch signal LAT, and the change signal CH input via the selector.

A functional configuration of the liquid discharge head unit 51 will be described with reference to FIG. 8. FIG. 8 is a block diagram showing the functional configuration of the liquid discharge head unit 51. As shown in FIG. 8, the liquid discharge head unit 51 has the wiring substrate 530, the liquid discharge head 510, and the relay substrate 120.

The wiring substrate 530 is a Printed Circuit Board (PCB), and is, for example, a rigid substrate such as a ceramic substrate or a glass epoxy substrate. The wiring substrate 530 is a so-called multilayer wiring substrate in which a plurality of layers are laminated. Each layer laminated at the wiring substrate 530 is also referred to as a “wiring layer”. The wiring substrate 530 is electrically coupled to each of the plurality of liquid discharge heads 510 via the relay substrate 120. Each of the drive signal COM, the reference voltage signal VBS, the print data signal SI, the clock signal SCK, the latch signal LAT, the change signal CH, and the switching signal SW is input to the wiring substrate 530 from the branch wiring substrate 520 via the cable 522. Each of the drive signal COM, the reference voltage signal VBS, the print data signal SI, the clock signal SCK, the latch signal LAT, the change signal CH, and the switching signal SW, which are input to the wiring substrate 530, propagates through the wiring substrate 530 and is input to the relay substrate 120. That is, the wiring substrate 530 branches and relays the drive signal COM, the reference voltage signal VBS, the print data signal SI, the clock signal SCK, the latch signal LAT, the change signal CH, and the switching signal SW between the branch wiring substrate 520 and the plurality of liquid discharge heads 510. The switching signal SW input to the relay substrate 120 switches whether the integrated circuit 121 outputs a drive voltage signal Vin or inputs a residual vibration Vout generated by the corresponding piezoelectric element 300 to the integrated circuit 121. The wiring substrate 530 is not limited to the rigid substrate, and various substrates, such as a flexible printed circuit and a rigid flexible printed circuit, may be used.

The relay substrate 120 couples the liquid discharge head 510 and the wiring substrate 530. The relay substrate 120 has the integrated circuit 121. The drive signal COM, the reference voltage signal VBS, the print data signal SI, the clock signal SCK, the latch signal LAT, the change signal CH, and the switching signal SW, which are input to the relay substrate 120, are input to the integrated circuit 121. However, the reference voltage signal VBS may not be input to the integrated circuit 121, and may be input to the liquid discharge head 510 via the second circuit 532 and the relay substrate 120. In the present embodiment, the integrated circuit 121 has a switch, and switches whether to apply the drive signal COM to the piezoelectric element 300 or to make the piezoelectric element 300 non-conducting. In the following description, the drive signal COM after the integrated circuit 121 is also referred to as a drive voltage signal Vin. By controlling whether or not to select a signal waveform included in the drive signal COM at a timing defined by the print data signal SI, the clock signal SCK, the latch signal LAT, and the change signal CH, the integrated circuit 121 generates the drive voltage signal Vin and outputs the generated drive voltage signal Vin to the first electrode 60 of the piezoelectric element 300 included in the liquid discharge head 510. The drive voltage signal Vin has a potential that differs depending on the discharge amount of ink by the liquid discharge head 510. The integrated circuit 121 tends to generate a larger amount of heat than the wiring substrate 530.

The reference voltage signal VBS is supplied to the second electrode 80 of the piezoelectric element 300. The reference voltage signal VBS is a signal having a potential that is as a reference for the displacement of the piezoelectric element 300, and is, for example, a signal having a potential such as a ground potential, DC 5.5 V, or DC 6 V. The reference voltage signal VBS has a potential which is constant regardless of the discharge amount from the liquid discharge head 510. In the present embodiment, the reference voltage signal VBS is generated by the drive signal output circuit 587. The reference voltage signal VBS may be generated by a voltage generation circuit (not shown) while being not limited to the drive signal output circuit 587. The piezoelectric element 300 included in the liquid discharge head 510 is driven according to a potential difference between the drive voltage signal Vin supplied to the first electrode 60 and the reference voltage signal VBS supplied to the second electrode 80. As a result, the amount of ink corresponding to the drive of the piezoelectric element 300 is discharged from the liquid discharge head 510.

The residual vibration Vout generated in the liquid discharge head 510 driven based on the drive voltage signal Vin is input to the integrated circuit 121 included in the relay substrate 120. The integrated circuit 121 may generate a residual vibration signal based on the input residual vibration Vout.

As shown in FIG. 8, in the present embodiment, the wiring substrate 530 includes a first circuit 531, a second circuit 532, and a temperature detection circuit 400. The first circuit 531 and the second circuit 532 include a conductor wiring formed at the wiring substrate 530, electronic components, electronic circuits, and the like which are mounted at the wiring substrate 530. In the present embodiment, the first circuit 531 is a drive voltage wiring for outputting the drive signal COM for generating the drive voltage signal Vin to the relay substrate 120. In the present embodiment, the second circuit 532 is a reference voltage wiring for supplying the reference voltage signal VBS, which is generated by the drive signal output circuit 587 and input to the wiring substrate 530, to the second electrode 80 which is a common electrode.

The temperature detection circuit 400 is electrically coupled to the detection resistor 401 and detects the voltage value used to calculate the electric resistance value of the detection resistor 401. The temperature detection circuit 400 includes a constant current circuit 430 and a voltage detection circuit 440. The constant current circuit 430 causes a constant current to flow through the detection resistor 401 under the control of the control section 540. The constant current circuit 430 is not limited to the wiring substrate 530, and may be provided at a substrate other than the wiring substrate 530, for example, a branch wiring substrate 520 or a control substrate 580. The voltage detection circuit 440 includes a differential amplification circuit 442 and an A/D converter 444. The differential amplification circuit 442 is an amplification circuit that amplifies a voltage value generated in the detection resistor 401 by the current supplied from the constant current circuit 430, and an instrumentation amplifier can be used. The A/D converter 444 converts the input analog voltage value into a digital signal and outputs the digital signal to the control section 540. The differential amplification circuit 442 may be omitted.

With reference to FIG. 9, a layout of the conductor wiring and the like of the wiring substrate 530 included in the liquid discharge head unit 51 of the present embodiment will be described. FIG. 9 is an explanatory diagram schematically showing a dispositional position of the temperature detection circuit 400 at the wiring substrate 530. In the example of FIG. 9, among a plurality of wiring layers included in the wiring substrate 530, a wiring layer LY1 in which the first circuit 531 and the second circuit 532 are disposed is shown. In the wiring layer LY1, the temperature detection circuit 400 is disposed in addition to the first circuit 531 and the second circuit 532. In FIG. 9, in order to facilitate the understanding of the technique, the first circuit 531, the second circuit 532, and the temperature detection circuit 400 are schematically shown in block shapes for respective regions occupying the wiring layer LY1 of the wiring substrate 530. The temperature detection circuit 400 may be formed over the plurality of layers of the wiring substrate 530, may include, for example, at least the wiring layer LY1 in which the first circuit 531 and the second circuit 532 are disposed, and may be disposed over another wiring layer.

FIG. 9 shows a first distance D1, a second distance D2, and a third distance D3. The first distance D1 means the shortest distance between the first circuit 531 and the second circuit 532. The second distance D2 means the shortest distance between the first circuit 531 and the temperature detection circuit 400. The third distance D3 means the shortest distance between the second circuit 532 and the temperature detection circuit 400. In an example of FIG. 9, the first distance D1, the second distance D2, and the third distance D3 are the shortest distances in the plan view of the wiring layer LY1, respectively. However, the embodiment is not limited to the shortest distance in a plan view, and the first distance D1, the second distance D2, and the third distance D3 may be the shortest distances in the three-dimensional space including the lamination direction of the wiring layers.

Here, when the temperature detection circuit 400 is disposed at the wiring substrate 530 inside the liquid discharge head 510, temperature measurement accuracy by the temperature detection circuit 400 may decrease. The inventors have newly found that the temperature measurement accuracy by the temperature detection circuit 400 may be decreased by being affected by heat and electrical noise from peripheral circuits or the like of the temperature detection circuit 400. The decrease in the detection accuracy of the temperature detection circuit 400 is particularly remarkable when a circuit that transmits a signal for driving the piezoelectric element 300, such as a drive voltage wiring for outputting the drive signal COM to the relay substrate 120 or a reference voltage wiring for supplying the reference voltage signal VBS to the second electrode 80 which is the common electrode, is disposed.

In the ink jet liquid discharge head 510 that discharges droplets using the piezoelectric element 300, for example, in order to adjust the pull-in amount of the meniscus and the return strength after the pull-in, a drive waveform having a large potential change with respect to time change, such as so-called pull-push-pull drive, may be applied to the piezoelectric element 300. Therefore, in the liquid discharge head unit 51, the amount of current flowing through the conductor wiring changes significantly, and the amount of heat generated in the electronic circuit changes significantly. As a result, it is presumed that the thermal change is transmitted to the temperature detection circuit 400 and decreases the temperature measurement accuracy by the temperature detection circuit 400. Further, when the amount of current flowing through the conductor wiring changes significantly, inductive noise from the peripheral circuits or the like of the temperature detection circuit 400 may increase. Therefore, it is presumed that the inductive noise is transmitted to the temperature detection circuit 400 and decreases the temperature measurement accuracy by the temperature detection circuit 400. Based on the above, from the viewpoint of reducing or preventing the influence of heat and electrical noise from the peripheral circuits of the temperature detection circuit 400, the liquid discharge head unit 51 of the present embodiment is configured to not dispose the conductor wiring, the electronic components, electronic circuits, and the like in the region from the temperature detection circuit 400 to a predetermined distance at the wiring substrate 530.

FIG. 9 shows a predetermined distance DN and a region NA from the temperature detection circuit 400 to the distance DN. The distance DN is a region where the temperature detection circuit 400 may be affected by heat and electrical noise from the peripheral circuits or the like due to the disposition of the conductor wiring, the electronic components, the electronic circuits, and the like. That is, when a circuit other than the temperature detection circuit 400, in the example of FIG. 9, the first circuit 531 or the second circuit 532 is disposed in the region NA, the temperature measurement accuracy by the temperature detection circuit 400 may decrease. The distance DN can be obtained experimentally in advance by using, for example, a relationship between the distance from the temperature detection circuit 400 and the temperature measurement accuracy by the temperature detection circuit 400.

In the present embodiment, the first circuit 531 and the second circuit 532 are not disposed at the region NA. In other words, each of the second distance D2 and the third distance D3 is set to be longer than the distance DN, and the first circuit 531 and the second circuit 532 are provided at positions farther than the predetermined distance DN from the temperature detection circuit 400. The first distance D1 between the first circuit 531 and the second circuit 532 may be set from the viewpoint of ensuring a quality of insulation or the like between the first circuit 531 and the second circuit 532 while avoiding a size of the wiring substrate 530 from being increased. In the present embodiment, each of the second distance D2 and the third distance D3 is set longer than the first distance D1. By disposing the first circuit 531 and the second circuit 532 at the positions farther than the first distance D1, it is possible to reduce or suppress the temperature detection circuit 400 from being affected by heat and electrical noise from the peripheral circuits or the like, so that it is possible to improve the temperature detection accuracy by the temperature detection circuit 400. In the present embodiment, the distance DN is designed to be 0.5 mm from the viewpoint to avoid influences of heat and electrical noise from the peripheral circuits while avoiding the size of the wiring substrate 530 from being increased. The distance DN is not limited to 0.5 mm. The distance DN is preferably equal to or longer than 0.5 mm, and more preferably equal to or longer than 1 mm, from the viewpoint to avoid being affected by heat and electrical noise from the peripheral circuits.

As described above, the liquid discharge head unit 51 of the present embodiment includes the liquid discharge head 510 and the wiring substrate 530 electrically coupled to the liquid discharge head 510. The liquid discharge head 510 includes a detection resistor 401 for detecting temperature of the pressure chamber 12, and the wiring substrate 530 includes the first circuit 531, the second circuit 532, and a temperature detection circuit 400 that is electrically coupled to the detection resistor 401. The first circuit 531, the second circuit 532, and the temperature detection circuit 400 are provided at the wiring substrate 530 so that each of the second distance D2 between the first circuit 531 and the temperature detection circuit 400 and the third distance D3 between the second circuit 532 and the temperature detection circuit 400 is longer than the first distance D1 between the first circuit 531 and the second circuit 532. Therefore, according to the liquid discharge head unit 51 of the present embodiment, the first circuit 531 and the second circuit 532 are disposed at the positions farther than the first distance D1 from the temperature detection circuit 400. Therefore, it is possible to reduce or suppress the temperature detection circuit 400 from being affected by heat and electrical noise from the peripheral circuits or the like, so that it is possible to improve the temperature detection accuracy by the temperature detection circuit 400.

According to the liquid discharge head unit 51 of the present embodiment, the detection resistor 401 is disposed at the same position as the piezoelectric element 300, that is, in the same layer as the piezoelectric element 300 in the lamination direction of the piezoelectric element 300 with respect to the pressure chamber substrate 10. By disposing the detection resistor 401 in the vicinity of the pressure chamber 12 in the liquid discharge head 510, it is possible to improve the temperature measurement accuracy of the ink inside the pressure chamber 12 by the detection resistor 401.

According to the liquid discharge head unit 51 of the present embodiment, the temperature detection circuit 400 includes the constant current circuit 430 for causing the constant current to flow through the detection resistor 401. Therefore, it is possible to improve measurement accuracy of the electric resistance value of the detection resistor 401 by the temperature detection circuit 400, and it is possible to improve the temperature measurement accuracy of the ink in the pressure chamber 12.

According to the liquid discharge head unit 51 of the present embodiment, the temperature detection circuit 400 includes the voltage detection circuit 440 for detecting the voltage generated in the detection resistor 401 by the current flowing from the constant current circuit 430. By providing the voltage detection circuit 440 at the wiring substrate 530, it is possible to shorten a wiring length of the voltage detection circuit 440 as compared with a case where the voltage detection circuit 440 is disposed at another circuit substrate such as the control substrate 580, so that it is possible to improve the measurement accuracy of the electric resistance value of the detection resistor 401 by the temperature detection circuit 400 and improve the temperature measurement accuracy of the ink in the pressure chamber 12.

According to the liquid discharge head unit 51 of the present embodiment, there is provided the relay substrate 120 which couples the liquid discharge head 510 and the wiring substrate 530, that is, the relay substrate 120 provided with the integrated circuit 121 that generates the drive voltage signal Vin for driving the piezoelectric element 300. By providing a drive IC having a larger heat generation amount than the wiring substrate 530 at the circuit substrate positioned closer to the liquid discharge head 510 than the wiring substrate 530, it is possible to reduce heat conduction to the temperature detection circuit 400 as compared with a case where the integrated circuit 121 is provided at the wiring substrate 530.

According to the liquid discharge head unit 51 of the present embodiment, the wiring substrate 530 is a rigid substrate and the relay substrate 120 is a flexible printed circuit. By setting the relay substrate 120, at which the integrated circuit 121 is disposed, as the flexible printed circuit, the increase in a size of the liquid discharge head unit 51 is suppressed. By setting the wiring substrate 530 provided with the temperature detection circuit 400 as the rigid substrate, it is possible to reduce the temperature detection circuit 400 from being affected by heat conduction or inductive noise, as compared with a case where the wiring substrate 530 is the flexible printed circuit.

According to the liquid discharge head unit 51 of the present embodiment, the first circuit 531 and the second circuit 532 are provided at the positions farther than the predetermined distance DN from the temperature detection circuit 400. Therefore, it is possible to reduce or prevent the temperature detection circuit 400 from being affected by heat and electrical noise from the first circuit 531 and the second circuit 532.

In the liquid discharge head unit 51 of the present embodiment, the predetermined distance DN is 0.5 mm. Therefore, it is possible to reduce or prevent the temperature detection circuit 400 from being affected by heat and electrical noise from the first circuit 531 and the second circuit 532 while avoiding the size of the wiring substrate 530 from being increased.

According to the liquid discharge head unit 51 of the present embodiment, the wiring substrate 530 includes a plurality of laminated wiring layers. The first circuit 531, the second circuit 532, and the temperature detection circuit 400 are disposed in the same wiring layer LY1 among the plurality of wiring layers. Each of the second distance D2 and the third distance D3 is set to be longer than the first distance D1. By disposing the first circuit 531 and the second circuit 532 at the positions farther than the first distance D1, it is possible to reduce or suppress the temperature detection circuit 400 from being affected by heat and electrical noise from the peripheral circuits or the like, so that it is possible to improve the temperature detection accuracy by the temperature detection circuit 400.

According to the liquid discharge head unit 51 of the present embodiment, the piezoelectric element 300 includes the first electrode 60 which is an individual electrode, the second electrode 80 which is a common electrode, and the piezoelectric body 70 which is provided between the first electrode 60 and the second electrode 80. The first circuit 531 is a drive voltage wiring for supplying the drive signal COM for generating the drive voltage signal Vin to the individual electrode. The drive signal COM has a voltage value that differs depending on the discharge amount of liquid. The second circuit 532 is a reference voltage wiring for supplying the reference voltage signal VBS, which has a voltage value that is constant regardless of the discharge amount, to the common electrode. By disposing a circuit, in which the detection accuracy of the temperature detection circuit 400 tends to be significantly reduced, at a position farther than the first distance D1 from the temperature detection circuit 400, it is possible to further improve the temperature detection accuracy by the temperature detection circuit 400.

In the liquid discharge head unit 51 of the present embodiment, the second distance D2 is longer than the third distance D3. Generally, the current value flowing through the drive voltage wiring that outputs the drive signal COM for generating the drive voltage signal Vin is larger than the current value flowing through the reference voltage wiring for supplying the reference voltage signal VBS to the common electrode. Therefore, the amount of heat of the drive voltage wiring may be larger than the amount of heat of the reference voltage wiring. According to the liquid discharge head unit 51 of the present embodiment, by separating the drive voltage wiring, which tends to generate a larger amount of heat than the reference voltage wiring, from the temperature detection circuit 400, it is possible to reduce heat transfer to the temperature detection circuit 400 from the first circuit 531 and the second circuit 532.

B. Second Embodiment

Figure 10:
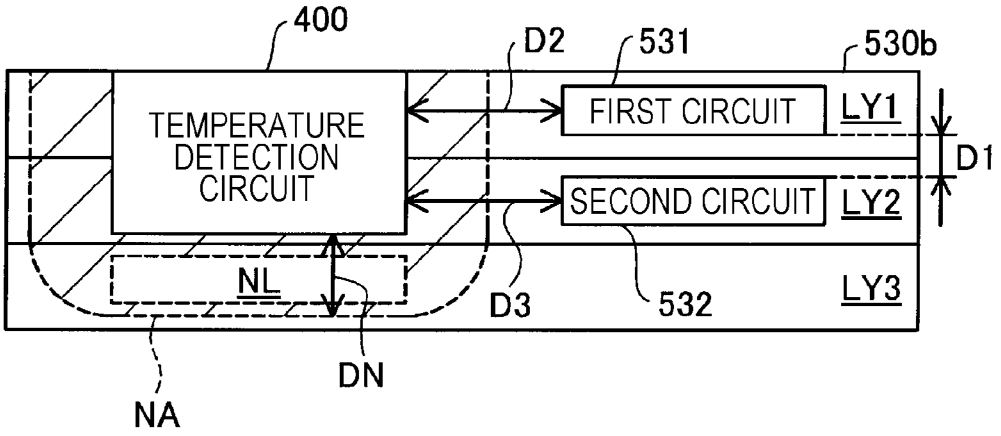
FIG. 10 is an explanatory diagram schematically showing a dispositional relationship between the temperature detection circuit, and a first circuit and a second circuit at the wiring substrate in a cross-sectional view.
Figure 11:
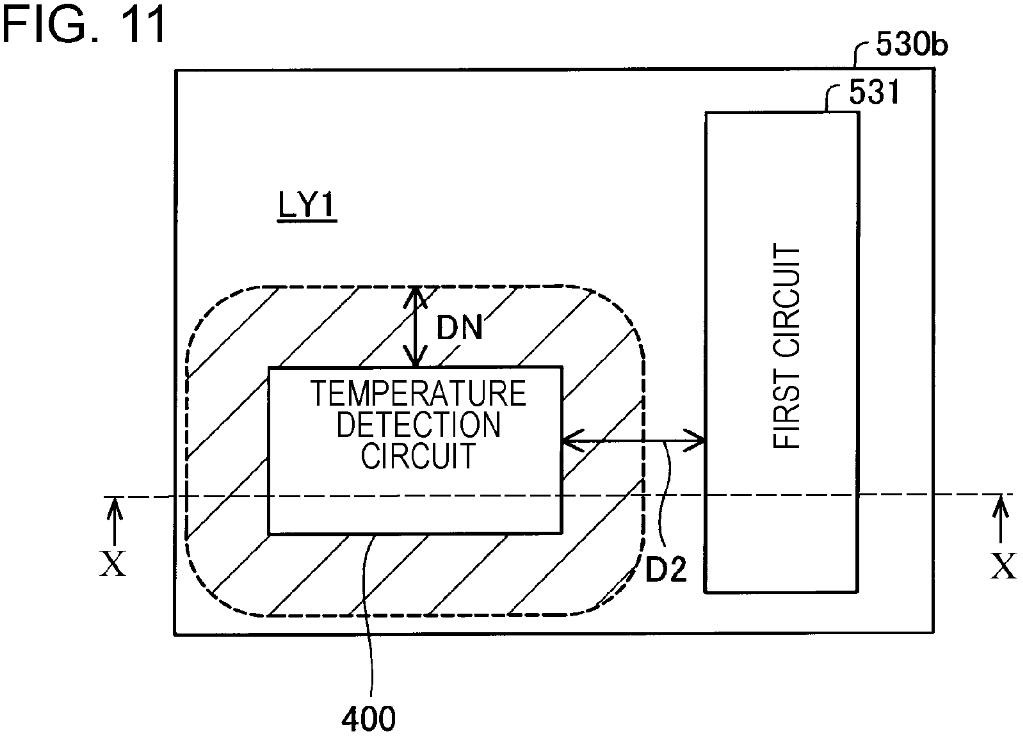
FIG. 11 is an explanatory diagram schematically showing a dispositional relationship between the temperature detection circuit and the first circuit at the wiring substrate in a plan view.
Figure 12:
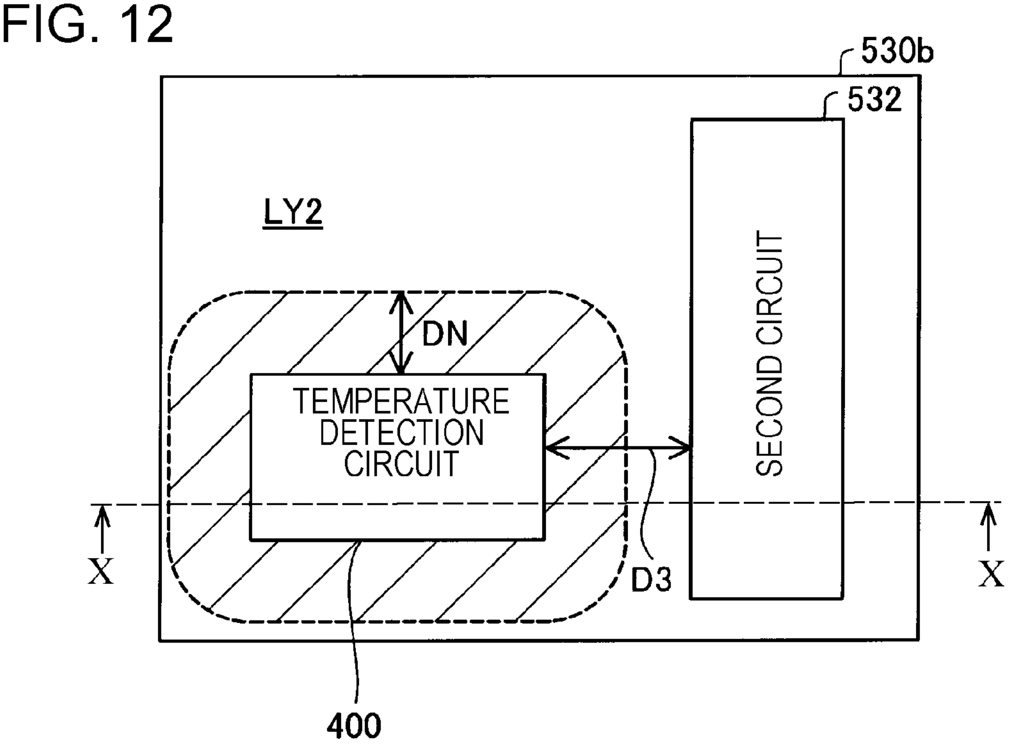
FIG. 12 is an explanatory diagram schematically showing a dispositional relationship between the temperature detection circuit and the second circuit at the wiring substrate in a plan view.

A configuration of the liquid discharge head unit 51 as a second embodiment of the present disclosure will be described with reference to FIGS. 10 to 12. The liquid discharge head unit 51 of the second embodiment is different from the liquid discharge head unit 51 of the first embodiment in a fact that a wiring substrate 530*b* is provided which has different dispositional positions of the first circuit 531 and the second circuit 532, instead of the wiring substrate 530. FIG. 10 is an explanatory diagram schematically showing a dispositional relationship between the temperature detection circuit 400, the first circuit 531, and the second circuit 532 at the wiring substrate 530*b* in a cross-sectional view. FIG. 11 is an explanatory diagram schematically showing a dispositional relationship between the temperature detection circuit 400 and the first circuit 531 at the wiring substrate 530*b* in a plan view. FIG. 12 is an explanatory diagram schematically showing a dispositional relationship between the temperature detection circuit 400 and the second circuit 532 at the wiring substrate 530*b* in a plan view. The cross-sectional view shown in FIG. 10 corresponds to a cross-sectional view at a X-X position shown in FIGS. 11 and 12.

As shown in FIG. 10, the wiring substrate 530*b* is formed by laminating a plurality of wiring layers. In the present embodiment, the wiring substrate 530*b* is laminated with three wiring layers from the wiring layer LY1 to the wiring layer LY3. The temperature detection circuit 400 is formed over two layers from the wiring layer LY1 to the wiring layer LY2.

As shown in FIG. 11, the first circuit 531 is provided in the wiring layer LY1 among the wiring layers LY1 to LY3. The second distance D2 is the shortest distance from the first circuit 531 to the temperature detection circuit 400 in a plan view of the wiring layer LY1. As shown in FIG. 12, the second circuit 532 is provided in the wiring layer LY2 among the wiring layers LY1 to LY3. The third distance D3 is the shortest distance from the first circuit 531 to the temperature detection circuit 400 in a plan view of the wiring layer LY2.

As shown in FIG. 10, the region NA also includes a region from the temperature detection circuit 400 to the predetermined distance DN in a lamination direction of the wiring layers LY1 to LY3. The first distance D1, the second distance D2, and the third distance D3 also mean the shortest distance in a three-dimensional space including the lamination direction, similarly. In the example of FIG. 10, the first distance D1 is the shortest distance between the first circuit 531 and the second circuit 532 in the lamination direction.

As shown in FIGS. 10 to 12, the first circuit 531 is disposed in the wiring layer LY1 at a position directly above the second circuit 532 in the wiring layer LY2. That is, the first circuit 531 and the second circuit 532 are disposed at positions which overlap each other in a plan view at the wiring substrate 530*b*. On the other hand, in the present embodiment, the first circuit 531 and the second circuit 532 are not disposed at a position which overlaps the temperature detection circuit 400 with each other in a plan view at the wiring substrate 530*b*. The position which overlaps the temperature detection circuit 400 with each other in a plan view at the wiring substrate 530*b* is, for example, a region NL which is directly below the temperature detection circuit 400 in the wiring layer LY3. In the present embodiment, from the viewpoint of further reducing the influence of heat transfer and inductive noise on the temperature detection circuit 400, the conductor wiring, the electronic components, and the electronic circuits other than the first circuit 531 and the second circuit 532 are not disposed at the region NL and the region NA.

According to the liquid discharge head unit 51 of the present embodiment, the first circuit 531 and the second circuit 532 are disposed at positions that do not overlap with the temperature detection circuit 400 in a plan view. Therefore, it is possible to reduce or suppress heat transfer and inductive noise from the first circuit 531 and the second circuit 532 to the temperature detection circuit 400 in the lamination direction, so that it is possible to improve the temperature detection accuracy by the temperature detection circuit 400.

According to the liquid discharge head unit 51 of the present embodiment, the wiring substrate 530*b* includes the plurality of laminated wiring layers LY1 to LY3. The first circuit 531 and the second circuit 532 are disposed in different wiring layers among the plurality of wiring layers LY1 to LY3. The first distance D1 is the shortest distance between the first circuit 531 and the second circuit 532 in the lamination direction. The second distance D2 is the shortest distance from the first circuit 531 to the temperature detection circuit 400 in the plan view of the wiring layer LY1, and the third distance D3 is the shortest distance from the first circuit 531 to the temperature detection circuit 400 in the plan view of the wiring layer LY2. By disposing the first circuit 531 and the second circuit 532 at positions farther than the first distance D1 in the lamination direction, it is possible to reduce or suppress the temperature detection circuit 400 from being affected by heat and electrical noise from the peripheral circuits or the like, so that it is possible to improve the temperature detection accuracy by the temperature detection circuit 400.

C. Other Aspects (C1) Each of the embodiments shows an example in which the first circuit 531 functions as the drive voltage wiring for supplying the drive voltage signal Vin, which differs depending on the discharge amount of ink by the liquid discharge head 510, to the first electrode 60 which is the individual wiring, and the second circuit 532 functions as the reference voltage wiring for supplying the reference voltage signal VBS, which is constant regardless of the discharge amount of ink by the liquid discharge head 510, to the second electrode 80 which is the common electrode. On the other hand, the first circuit 531 may be the reference voltage wiring and the second circuit 532 may be the drive voltage wiring. However, the first circuit 531 and the second circuit 532 are not limited to the drive voltage wiring and the reference voltage wiring, and may be, for example, the heating voltage wiring for applying the heating voltage that causes the heating resistor 601 to generate resistance heating. According to the liquid discharge head unit 51 of the aspect, when the wiring substrate 530 is provided with the heating voltage wiring, it is possible to reduce or suppress the temperature detection circuit 400 from being affected by heat and electrical noise from the heating voltage wiring. Further, the first circuit 531 and the second circuit 532 may be the ground wiring for grounding the temperature detection circuit 400. According to the liquid discharge head unit 51 of the aspect, when the wiring substrate 530 includes the ground wiring, it is possible to reduce or suppress the temperature detection circuit 400 from being affected by heat and electrical noise from the ground wiring. The first circuit 531 and the second circuit 532 may be the conductor wiring for outputting the print data signal SI, the clock signal SCK, the latch signal LAT, the change signal CH, and the switching signal SW which are input from the branch wiring substrate 520 to the relay substrate 120.

(C2) In each of the embodiments, an example is shown in which the liquid discharge device 500 includes the control substrate 580 provided with the drive signal output circuit 587 that generates the drive signal COM to be input to the integrated circuit 121 that generates the drive voltage signal Vin. On the other hand, the control substrate 580 may be included in the liquid discharge head unit 51. According to the liquid discharge head unit 51 of the aspect, the liquid discharge head unit 51 can have a function of controlling ink discharge.

(C3) In the liquid discharge head unit 51 of each of the above embodiments, the wiring substrate 530 may further include a cutoff circuit (circuit breaker) such as an electromagnetic elimination filter which is different from the first circuit 531 and the second circuit 532. The cutoff circuit cuts off the transmission of the drive signal COM and the reference voltage signal VBS to the temperature detection circuit 400. The first circuit 531, the second circuit 532, the temperature detection circuit 400, and the cutoff circuit may be disposed at the wiring substrate 530 so that the fourth distance from the cutoff circuit to the temperature detection circuit 400 is shorter than either the second distance D2 or the third distance D3. According to the liquid discharge head unit 51 of the aspect, it is possible to cut off transmission of the drive signal COM and the reference voltage signal VBS to the temperature detection circuit 400 by the cutoff circuit, so that it is possible to reduce or suppress the temperature detection circuit 400 from being affected by heat and electrical noise from the first circuit 531 and the second circuit 532.

(C4) In each of the embodiments, an example is shown in which the entire area of the temperature detection circuit 400 is disposed so as to be separated from the first circuit 531 and the second circuit 532 at a distance longer than the first distance D1. However, in the temperature detection circuit 400, only a specific part, at which the detection error is particularly large because of being provided at a position close to the first circuit 531 and the second circuit 532, may be disposed so as to be separated from the first circuit 531 and the second circuit 532 at a distance longer than the first distance D1. This specific part includes, for example, the constant current circuit 430 and the voltage detection circuit 440. At least one of the constant current circuit 430 and the voltage detection circuit 440 can be disposed so as to be separated from the first circuit 531 and the second circuit 532 at a distance longer than the first distance D1.

(C5) In each of the embodiments, the temperature detection circuit 400 is composed of a series of members. However, the temperature detection circuit 400 may be divided into a plurality of members. In this case, each of the plurality of members constituting the temperature detection circuit 400 may be provided so as to be separated from the first circuit 531 and the second circuit 532 at a distance longer than the first distance D1.

The present disclosure is not limited to the above-described embodiments, and can be realized in various configurations without departing from the gist of the present disclosure. Technical features in the embodiments corresponding to technical features in respective aspects described in outline of the present disclosure can be appropriately replaced or combined in order to solve some or all of the above-described problems or achieve some or all of the above-described effects. Further, when the technical features are not described as essential in the present specification, the technical features can be appropriately deleted.

(1) According to an aspect of the present disclosure, a liquid discharge head unit is provided. The liquid discharge head unit includes a liquid discharge head provided with a pressure chamber substrate having a plurality of pressure chambers, a piezoelectric element laminated at the pressure chamber substrate to apply pressure to each of the plurality of pressure chambers, and a drive wiring for applying a voltage for driving the piezoelectric element to the piezoelectric element, and a wiring substrate electrically coupled to the liquid discharge head. The liquid discharge head is provided with a detection resistor formed of the same material as the piezoelectric element or the drive wiring and used to detect a temperature of the pressure chamber. The wiring substrate is provided with a first circuit, a second circuit different from the first circuit, and a temperature detection circuit electrically coupled to the detection resistor. The first circuit, the second circuit, and the temperature detection circuit are provided at the wiring substrate so that a distance between the first circuit and the second circuit is a first distance, a distance between the first circuit and the temperature detection circuit is a second distance longer than the first distance, and a distance between the second circuit and the temperature detection circuit is a third distance longer than the first distance. According to the liquid discharge head unit, by disposing the first circuit and the second circuit at a position farther than the first distance from the temperature detection circuit, it is possible to reduce or prevent the temperature detection circuit from being affected by heat and electrical noise from the first circuit and the second circuit, so that it is possible to improve the temperature detection accuracy by the temperature detection circuit.

(2) In the liquid discharge head unit of the aspect, at least some of the detection resistor may be disposed at the same position as the piezoelectric element in a lamination direction of the piezoelectric element with respect to the pressure chamber substrate. According to the liquid discharge head unit of the aspect, by disposing the detection resistor in the vicinity of the pressure chamber, it is possible to improve temperature measurement accuracy of the pressure chamber by the detection resistor.

(3) In the liquid discharge head unit of the aspect, the temperature detection circuit may include a constant current circuit for causing a constant current to flow through the detection resistor. According to the liquid discharge head unit of the aspect, it is possible to improve the measurement accuracy of the electric resistance value of the detection resistor by the temperature detection circuit, so that it is possible to improve the temperature measurement accuracy of the pressure chamber.

(4) In the liquid discharge head unit of the aspect, the temperature detection circuit may include a voltage detection circuit for detecting a voltage generated in the detection resistor by a current flowing from the constant current circuit. According to the liquid discharge head unit of the aspect, it is possible to shorten a wiring length of the voltage detection circuit as compared with a case where the voltage detection circuit is disposed on the outer side of the liquid discharge head unit, and it is possible to improve the measurement accuracy of the electric resistance value of the detection resistor by the temperature detection circuit.

(5) The liquid discharge head unit of the aspect may further include a relay substrate that couples the liquid discharge head and the wiring substrate and is provided with an integrated circuit that generates a drive voltage signal for driving the piezoelectric element. According to the liquid discharge head unit of the aspect, it is possible to reduce heat conduction to the temperature detection circuit by providing a drive IC having a larger heat generation amount than the wiring substrate at the circuit substrate which is closer to the liquid discharge head than the wiring substrate.

(6) In the liquid discharge head unit of the aspect, the wiring substrate may be a rigid substrate, and the relay substrate may be a flexible printed circuit. According to the liquid discharge head unit of the aspect, by setting the relay substrate, at which the integrated circuit is disposed, as the flexible printed circuit, the increase in a size of the liquid discharge head unit is suppressed. By setting the wiring substrate provided with the temperature detection circuit as the rigid substrate, it is possible to reduce the temperature detection circuit from being affected by heat conduction or inductive noise, as compared with a case where the wiring substrate is the flexible printed circuit.

(7) The liquid discharge head unit of the aspect may further include a control substrate that is different from the wiring substrate and the relay substrate and is provided with a drive signal output circuit that generates a drive signal input to the integrated circuit that generates the drive voltage signal. According to the liquid discharge head unit of the aspect, the liquid discharge head unit can have a function of controlling liquid discharge.

(8) In the liquid discharge head unit of the aspect, the first circuit and the second circuit may be disposed at positions that do not overlap with the temperature detection circuit in a plan view. According to the liquid discharge head unit of the aspect, it is possible to reduce or suppress heat transfer and inductive noise from the first circuit and the second circuit to the temperature detection circuit in the lamination direction, so that it is possible to improve the temperature detection accuracy by the temperature detection circuit.

(9) In the liquid discharge head unit of the aspect, the first circuit and the second circuit may be provided at positions farther than a predetermined distance from the temperature detection circuit. According to the liquid discharge head unit of the aspect, it is possible to reduce or prevent the temperature detection circuit from being affected by heat and electrical noise from the first circuit and the second circuit.

(10) In the liquid discharge head unit of the aspect, the predetermined distance may be 0.5 mm. According to the liquid discharge head unit of the aspect, it is possible to reduce or prevent the temperature detection circuit from being affected by heat and electrical noise from the first circuit and the second circuit while avoiding a size of the wiring substrate from being increased.

(11) In the liquid discharge head unit of the aspect, the wiring substrate may include a plurality of laminated wiring layers. The first circuit and the second circuit may be disposed in the same wiring layer among the plurality of wiring layers. The temperature detection circuit may be disposed at least in the same wiring layer. The first distance may be a distance from the first circuit to the second circuit in a plan view of the same wiring layer, the second distance may be a distance from the first circuit to the temperature detection circuit in the plan view of the same wiring layer, and the third distance may be a distance from the second circuit to the temperature detection circuit in the plan view of the same wiring layer. According to the liquid discharge head unit of the aspect, it is possible to reduce or suppress the temperature detection circuit from being affected by heat and electrical noise from the peripheral circuits or the like, so that it is possible to improve the temperature detection accuracy by the temperature detection circuit.

(12) In the liquid discharge head unit of the aspect, the wiring substrate may include a plurality of laminated wiring layers. The first circuit and the second circuit may be respectively disposed in different wiring layers among the plurality of wiring layers. The first distance may be a distance from the first circuit to the second circuit in a lamination direction of the plurality of wiring layers, the second distance may be a distance from the first circuit to the temperature detection circuit in a plan view of the wiring substrate, and the third distance may be a distance from the second circuit to the temperature detection circuit in the plan view of the wiring substrate. According to the liquid discharge head unit of the aspect, it is possible to reduce or suppress the temperature detection circuit from being affected by heat and electrical noise from the peripheral circuits or the like, so that it is possible to improve the temperature detection accuracy by the temperature detection circuit.

(13) In the liquid discharge head unit of the aspect, the piezoelectric element may include an individual electrode individually provided for the plurality of pressure chambers, a common electrode commonly provided for the plurality of pressure chambers, and a piezoelectric body provided between the individual electrode and the common electrode. The first circuit may be a drive voltage wiring that outputs a drive signal having a voltage value which differs depending on the discharge amount of liquid, and the second circuit may be a reference voltage wiring for supplying a reference voltage signal having a voltage value which is constant regardless of the discharge amount to the common electrode. According to the liquid discharge head unit of the aspect, by disposing a circuit, in which the detection accuracy of the temperature detection circuit tends to be significantly reduced, at a position farther than the first distance from the temperature detection circuit, it is possible to further improve the temperature detection accuracy by the temperature detection circuit.

(14) In the liquid discharge head unit of the aspect, the second distance may be longer than the third distance. According to the liquid discharge head unit of the aspect, by separating the drive voltage wiring, which tends to generate a larger amount of heat than the reference voltage wiring, from the temperature detection circuit, it is possible to reduce heat transfer to the temperature detection circuit from the first circuit and the second circuit.

(15) In the liquid discharge head unit of the aspect, wiring substrate may further include a cutoff circuit that is different from the first circuit and the second circuit, and may cut off transmission of the drive signal and the reference voltage signal to the temperature detection circuit. The first circuit, the second circuit, the temperature detection circuit, and the cutoff circuit may be provided at the wiring substrate so that a distance from the cutoff circuit to the temperature detection circuit is a fourth distance which is shorter than either the second distance or the third distance. According to the liquid discharge head unit of the aspect, it is possible to cut off transmission of the drive signal and the reference voltage signal to the temperature detection circuit by the cutoff circuit, so that it is possible to reduce or suppress the temperature detection circuit from being affected by heat and electrical noise from the first circuit and the second circuit.

(16) In the liquid discharge head unit of the aspect, the liquid discharge head may further include a heating resistor for heating a liquid inside the pressure chamber. At least one of the first circuit and the second circuit may be a heating voltage wiring for applying a heating voltage that causes the heating resistor to generate resistance heating. According to the liquid discharge head unit of the aspect, when the wiring substrate includes the heating voltage wiring, it is possible to reduce or suppress the temperature detection circuit from being affected by heat and electrical noise from the heating voltage wiring.

(17) In the liquid discharge head unit of the aspect, at least one of the first circuit and the second circuit may be a ground wiring for grounding the temperature detection circuit. According to the liquid discharge head unit of the aspect, when the wiring substrate includes the ground wiring, it is possible to reduce or suppress the temperature detection circuit from being affected by heat and electrical noise from the ground wiring.

(18) In the liquid discharge head unit of the aspect, at least one of the first circuit and the second circuit may be a logic circuit.

(19) According to another aspect of the present disclosure, there is provided a liquid discharge device. The liquid discharge device includes the liquid discharge head unit of the above aspect, and a liquid accommodation section that accommodates a liquid discharged from the liquid discharge head unit. According to the liquid discharge device, by disposing the first circuit and the second circuit at a position farther than the first distance from the temperature detection circuit, it is possible to reduce or suppress the temperature detection circuit from being affected by heat and electrical noise from the first circuit and the second circuit, so that it is possible to improve the temperature detection accuracy by the temperature detection circuit.

The present disclosure can also be realized in various aspects other than the liquid discharge head unit and the liquid discharge device. For example, it is possible to realize the present disclosure with an aspect of a method for manufacturing a liquid discharge head unit, a method for manufacturing a liquid discharge device, or the like.

The present disclosure is not limited to an ink jet method, and can be applied to any liquid discharge devices that discharge a liquid other than ink and a liquid discharge head that is used in the liquid discharge devices. For example, the present disclosure can be applied to the following various liquid discharge devices and liquid discharge heads thereof.

(1) An image recording device such as a facsimile device.

(2) A color material discharge device used for manufacturing a color filter for an image display device such as a liquid crystal display.

(3) An electrode material discharge device used for forming electrodes of an organic Electro Luminescence (EL) display, a Field Emission Display (FED), or the like.

(4) A liquid discharge device that discharges a liquid containing a bioorganic substance used for manufacturing a biochip.

(5) A sample discharge device as a precision pipette.

(6) A lubricating oil discharge device.

(7) A resin liquid discharge device.

(8) A liquid discharge device that discharges lubricating oil with pinpoint to a precision machine such as a watch or a camera.

(9) A liquid discharge device that discharges a transparent resin liquid, such as an ultraviolet curable resin liquid, onto a substrate in order to form a micro hemispherical lens (optical lens) or the like used for an optical communication element or the like.

(10) A liquid discharge device that discharges an acidic or alkaline etching liquid for etching a substrate or the like.

(11) A liquid discharge device including a liquid consumption head that discharges any other minute amount of droplets.

The "droplet" refers to a state of the liquid discharged from the liquid discharge device, and includes those having a granular, tear-like, or thread-like tail. Further, the "liquid" referred to here may be any material that can be consumed by the liquid discharge device. For example, the "liquid" may be a material in a state when a substance is liquefied, and the "liquid" includes a liquid state material with high or low viscosity and a liquid state material, such as a sol, gel water, other inorganic solvent, organic solvent, solution, liquid resin, and liquid metal (metal melt). Further, the "liquid" includes not only a liquid as a state of a substance but also a liquid in which particles of a functional material made of a solid substance, such as a pigment or a metal particle, are dissolved, dispersed, or mixed in a solvent. Further, as a typical example of a combination of a first liquid and a second liquid, in addition to a combination of ink and reaction liquid as described in the embodiments, the following can be mentioned.

(1) Adhesive main agent and curing agent (2) Paint-based paints and diluents, clear paints and diluents (3) Main solvent and diluting solvent containing cells of ink for cells (4) Metallic leaf pigment dispersion liquid and diluting solvent of ink (metallic ink) that develops metallic luster.

(5) Gasoline/diesel and biofuel for vehicle fuel (6) Main ingredients and protective ingredients of medicine.

(7) Light Emitting Diode (LED) fluorescent material and encapsulant

What is claimed is:

1. A liquid discharge head unit comprising:

a liquid discharge head provided with a pressure chamber substrate having a plurality of pressure chambers, a piezoelectric element laminated on the pressure chamber substrate to apply pressure to each of the plurality of pressure chambers, and a drive wiring for applying a voltage for driving the piezoelectric element to the piezoelectric element; and a wiring substrate electrically coupled to the liquid discharge head, wherein the liquid discharge head is provided with a detection resistor formed of the same material as the piezoelectric element or the drive wiring and used to detect a temperature of the pressure chamber, the wiring substrate is provided with a first circuit, a second circuit different from the first circuit, and a temperature detection circuit electrically coupled to the detection resistor, and the first circuit, the second circuit, and the temperature detection circuit are provided at the wiring substrate so that a distance between the first circuit and the second circuit is a first distance, a distance between the first circuit and the temperature detection circuit is a second distance longer than the first distance, and a distance between the second circuit and the temperature detection circuit is a third distance longer than the first distance.

2. The liquid discharge head unit according to claim 1, wherein at least some of the detection resistor is disposed at the same position as the piezoelectric element in a lamination direction of the piezoelectric element with respect to the pressure chamber substrate.

3. The liquid discharge head unit according to claim 1, wherein the temperature detection circuit includes a constant current circuit for causing a constant current to flow through the detection resistor.

4. The liquid discharge head unit according to claim 3, wherein the temperature detection circuit includes a voltage detection circuit for detecting a voltage generated in the detection resistor by a current flowing from the constant current circuit.

5. The liquid discharge head unit according to claim 1, further comprising:

a relay substrate that couples the liquid discharge head and the wiring substrate and is provided with an integrated circuit that generates a drive voltage signal for driving the piezoelectric element.

6. The liquid discharge head unit according to claim 5, wherein the wiring substrate is a rigid substrate, and the relay substrate is a flexible printed circuit.

7. The liquid discharge head unit according to claim 5, further comprising:

a control substrate that is different from the wiring substrate and the relay substrate and is provided with a drive signal output circuit that generates a drive signal input to the integrated circuit that generates the drive voltage signal.

8. The liquid discharge head unit according to claim 1, wherein the first circuit and the second circuit are disposed at positions that do not overlap with the temperature detection circuit in a plan view.

9. The liquid discharge head unit according to claim 1, wherein the first circuit and the second circuit are provided at positions farther than a predetermined distance from the temperature detection circuit.

10. The liquid discharge head unit according to claim 9, wherein the predetermined distance is 0.5 mm.

11. The liquid discharge head unit according to claim 1, wherein the wiring substrate includes a plurality of laminated wiring layers, the first circuit and the second circuit are disposed in the same wiring layer among the plurality of wiring layers, the temperature detection circuit is disposed at least in the same wiring layer, the first distance is a distance from the first circuit to the second circuit in a plan view of the same wiring layer, the second distance is a distance from the first circuit to the temperature detection circuit in the plan view of the same wiring layer, and the third distance is a distance from the second circuit to the temperature detection circuit in the plan view of the same wiring layer.

12. The liquid discharge head unit according to claim 1, wherein the wiring substrate includes a plurality of laminated wiring layers, the first circuit and the second circuit are respectively disposed in different wiring layers among the plurality of wiring layers, the first distance is a distance from the first circuit to the second circuit in a lamination direction of the plurality of wiring layers, the second distance is a distance from the first circuit to the temperature detection circuit in a plan view of the wiring substrate, and the third distance is a distance from the second circuit to the temperature detection circuit in the plan view of the wiring substrate.

13. The liquid discharge head unit according to claim 1, wherein the piezoelectric element includes an individual electrode individually provided for the plurality of pressure chambers, a common electrode commonly provided for the plurality of pressure chambers, and a piezoelectric body provided between the individual electrode and the common electrode, the first circuit is a drive voltage wiring that outputs a drive signal having a voltage value which differs depending on the discharge amount of liquid, and the second circuit is a reference voltage wiring for supplying a reference voltage signal having a voltage value which is constant regardless of the discharge amount to the common electrode.

14. The liquid discharge head unit according to claim 13, wherein the second distance is longer than the third distance.

15. The liquid discharge head unit according to claim 13, wherein the wiring substrate further includes a cutoff circuit that is different from the first circuit and the second circuit, and cuts off transmission of the drive signal and the reference voltage signal to the temperature detection circuit, and the first circuit, the second circuit, the temperature detection circuit, and the cutoff circuit are provided at the wiring substrate so that a distance from the cutoff circuit to the temperature detection circuit is a fourth distance which is shorter than either the second distance or the third distance.

16. The liquid discharge head unit according to claim 1, wherein the liquid discharge head further includes a heating resistor for heating a liquid inside the pressure chamber, and at least one of the first circuit and the second circuit is a heating voltage wiring for applying a heating voltage that causes the heating resistor to generate resistance heating.

17. The liquid discharge head unit according to claim 1, wherein at least one of the first circuit and the second circuit is a ground wiring for grounding the temperature detection circuit.

18. The liquid discharge head unit according to claim 1, wherein at least one of the first circuit and the second circuit is a logic circuit.

19. A liquid discharge device comprising:

the liquid discharge head unit according to claim 1; and a liquid accommodation section that accommodates a liquid discharged from the liquid discharge head unit.

* * * * *